United States Patent
Ohno et al.

(10) Patent No.: US 7,848,546 B2
(45) Date of Patent: Dec. 7, 2010

(54) INFORMATION PROCESSING APPARATUS, INFORMATION PROCESSING METHOD, PROGRAM, AND STORAGE MEDIUM

(75) Inventors: Tomoyuki Ohno, Zama (JP); Shuntaro Aratani, Machida (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1127 days.

(21) Appl. No.: 11/470,387

(22) Filed: Sep. 6, 2006

(65) Prior Publication Data
US 2007/0057966 A1    Mar. 15, 2007

(30) Foreign Application Priority Data
Sep. 9, 2005    (JP)    ............................. 2005-262988

(51) Int. Cl.
G06K 9/00    (2006.01)
G06K 9/46    (2006.01)
G06F 17/30    (2006.01)
G06F 17/00    (2006.01)
H04N 7/26    (2006.01)
H04N 5/222    (2006.01)

(52) U.S. Cl. .................. 382/118; 382/165; 382/190; 707/E17.03; 715/210; 375/E7.13; 348/333.05

(58) Field of Classification Search ................ 382/118, 382/162, 165, 190, 203, 209; 711/112; 358/1.11; 375/E7.13; 348/135, 155, 333.05, 333.04; 715/730–732, 202, 210; 707/E17.03
See application file for complete search history.

(56) References Cited

U.S. PATENT DOCUMENTS

| 5,570,434 | A  | * | 10/1996 | Badique ...................... 382/279 |
| 6,639,998 | B1 | * | 10/2003 | Lee et al. ...................... 382/103 |
| 7,239,347 | B2 |   | 7/2007  | Yamamoto et al. ......... 348/231.2 |
| 7,656,400 | B2 | * | 2/2010  | Oka et al. .................... 345/418 |
| 2004/0264780 | A1 | | 12/2004 | Zhang et al. ................. 382/224 |
| 2005/0001933 | A1 | | 1/2005  | Yoshikawa et al. .......... 348/564 |
| 2007/0057933 | A1 | | 3/2007  | Ohno et al. .................. 345/204 |

FOREIGN PATENT DOCUMENTS

| JP | 2001-357067 | 12/2001 |
| WO | WO 00/16243 | 3/2000 |
| WO | WO 02/41188 | 5/2002 |

OTHER PUBLICATIONS

Laurenz Wiskott, et al., *Face Recognition by Elastic Bunch Graph Matching*, IEEE Transactions on Pattern Analysis and Machine Intelligence, vol. 19, No. 7, pp. 775-779, 1997.

* cited by examiner

*Primary Examiner*—Sheela C Chawan
(74) *Attorney, Agent, or Firm*—Fitzpatrick, Cella, Harper & Scinto

(57) ABSTRACT

This invention is directed to reduce the correction load on a user when a plurality of images are to be grouped. An information processing method of discriminating an object contained in a first image and grouping the first image to a plurality of grouping destinations for each object includes a discrimination step of discriminating an object from the first image, a grouping destination determination step of determining, on the basis of the discrimination result obtained in the discrimination step, to which one of the plurality of grouping destinations the first image is to be grouped, and a display control step of displaying, on a window, a process of moving the first image to a position of the second image corresponding to the grouping destination determined in the grouping destination determination step.

9 Claims, 23 Drawing Sheets

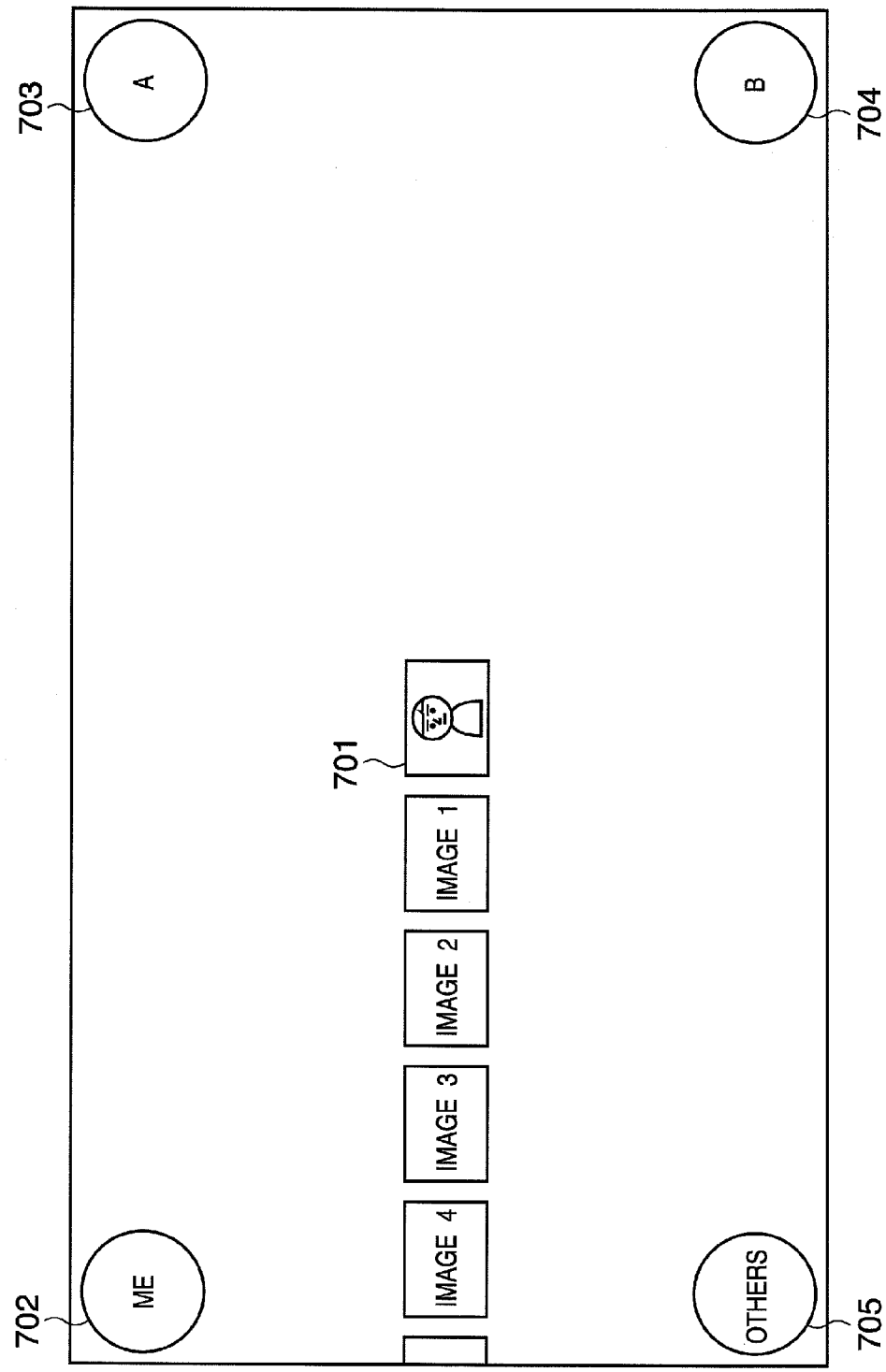

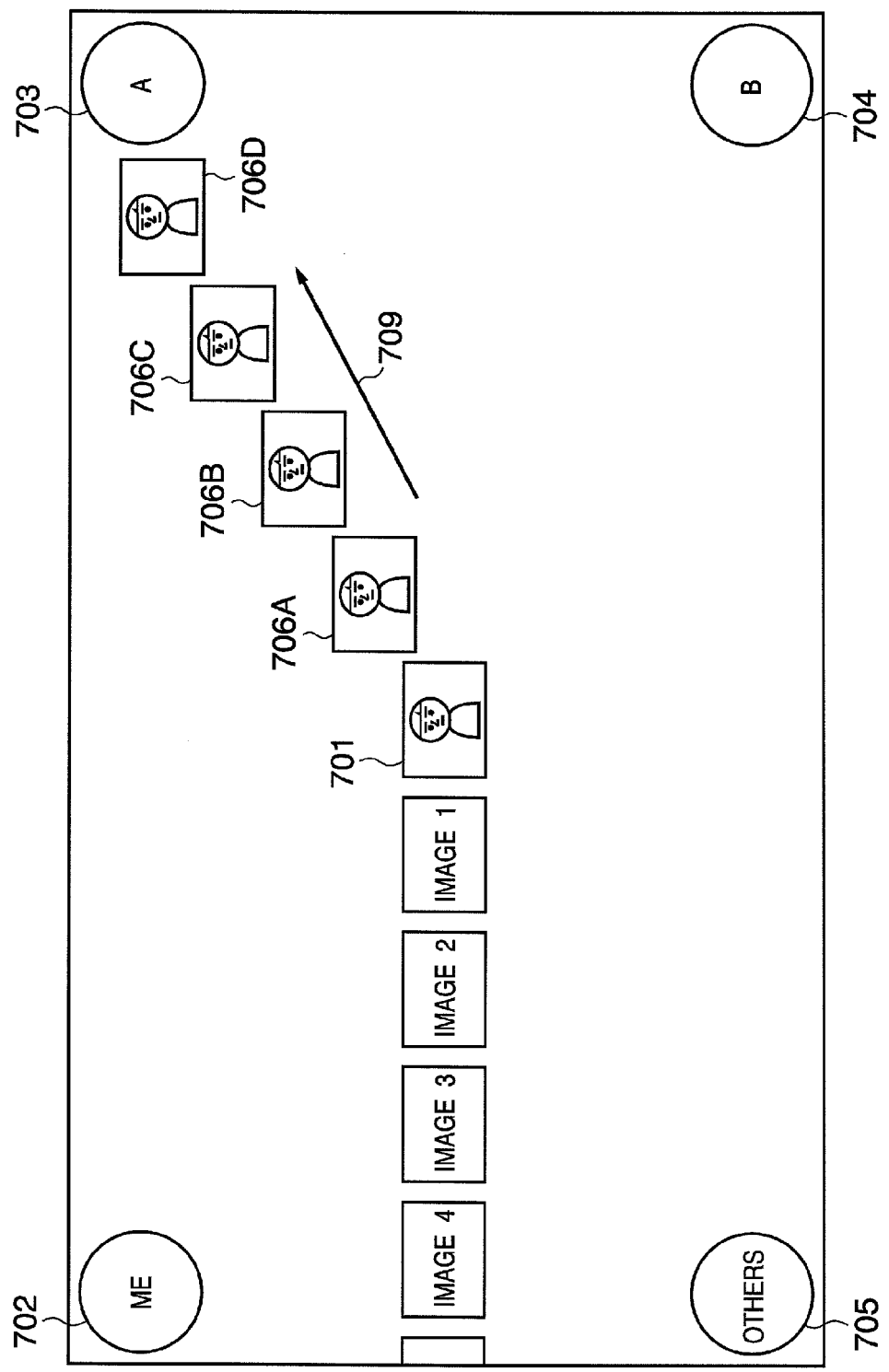

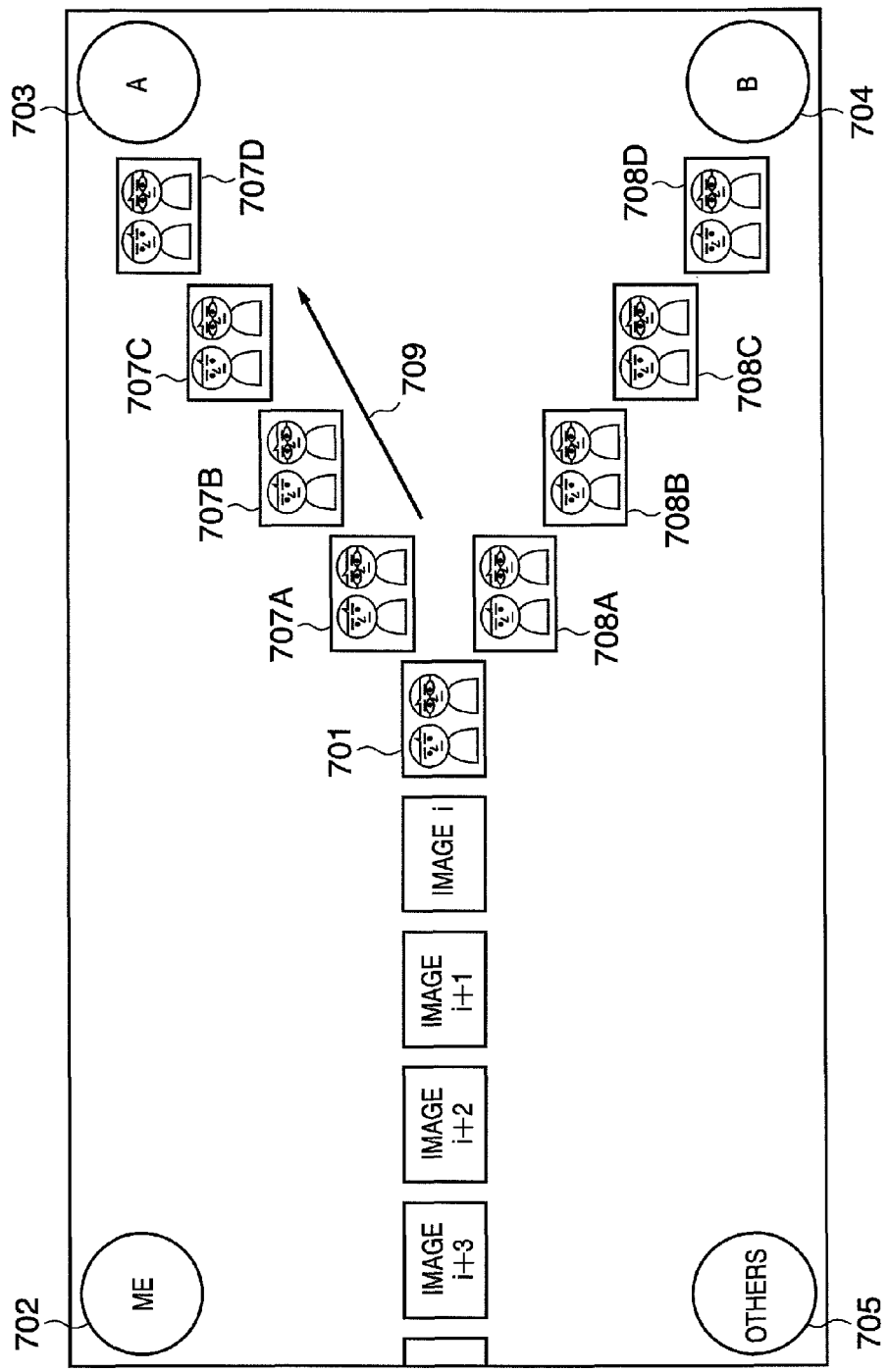

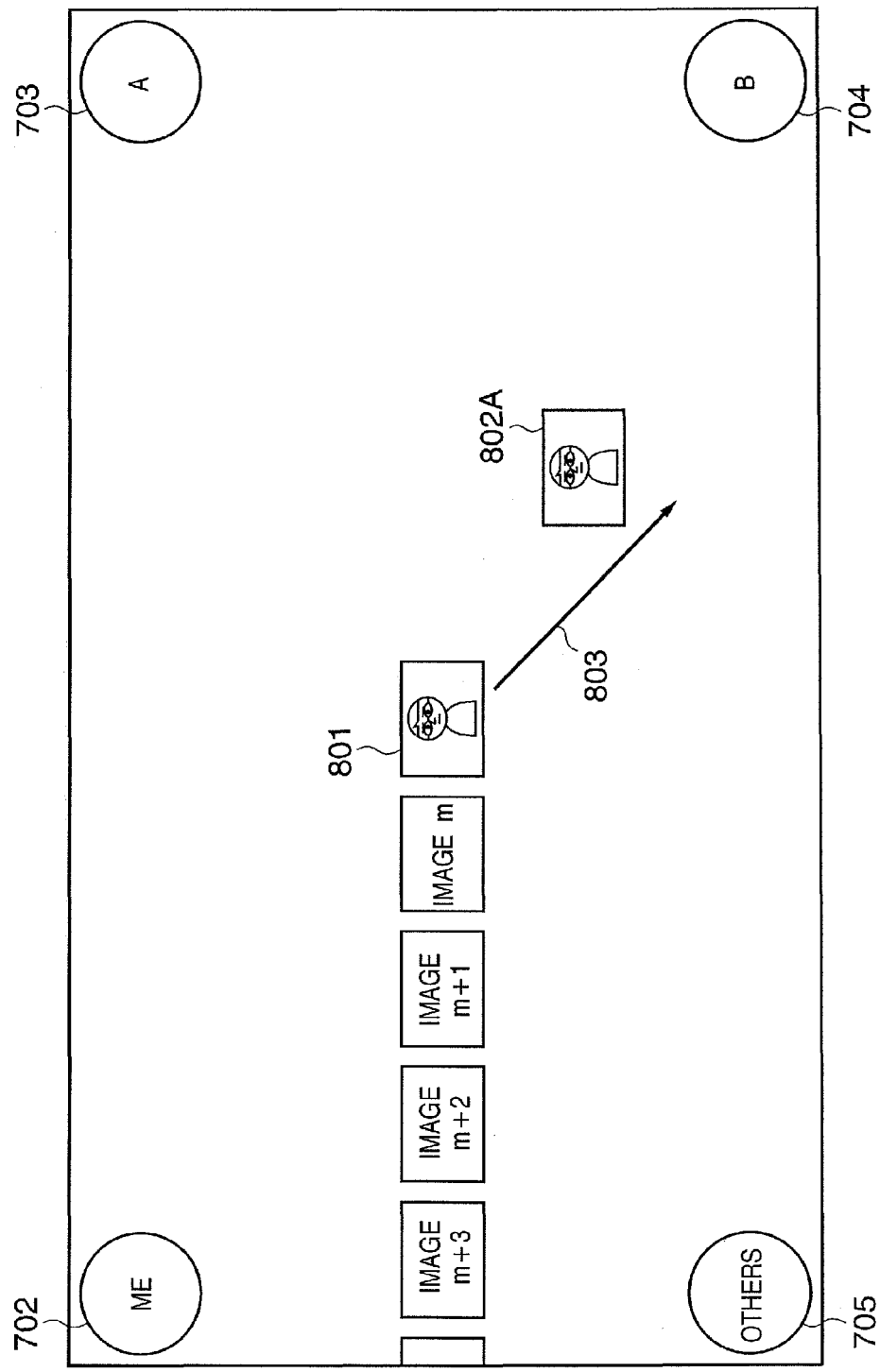

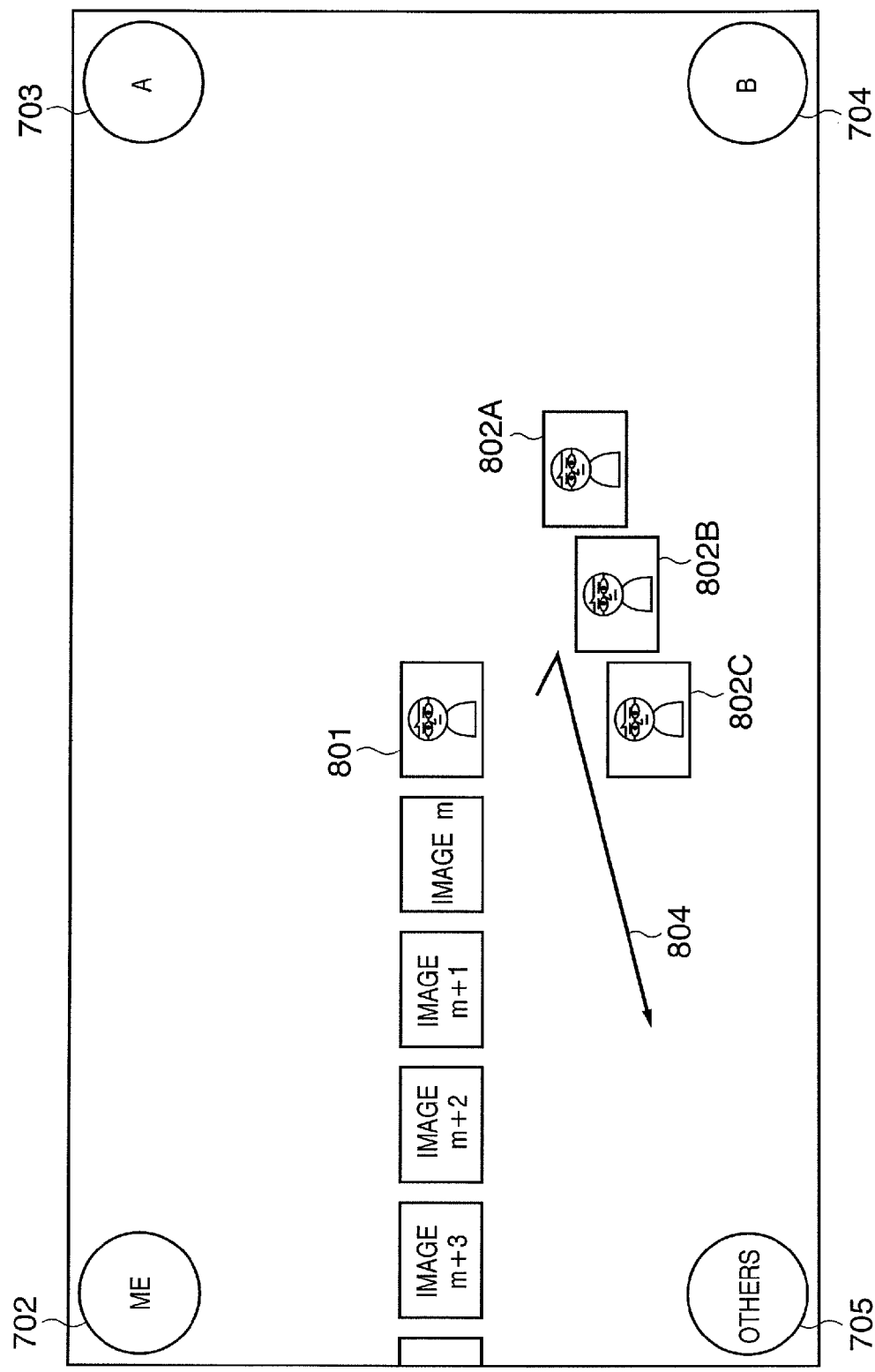

INFORMATION PROCESSING APPARATUS, INFORMATION PROCESSING METHOD, PROGRAM, AND STORAGE MEDIUM

BACKGROUND OF THE INVENTION

1. Field of the Invention

The present invention relates to a technique of grouping images recorded by a digital still camera, a digital video camera, or the like.

2. Description of the Related Art

Viewing images recorded by a digital still camera (to be referred to as a DSC hereinafter) or a digital video camera (to be referred to as a DVC hereinafter) on a personal computer or television has become popular.

Japanese Patent Laid-Open No. 2001-357067 discloses an image search method of searching these images for images containing persons or specific persons as objects, grouping them, creating a collection of images containing persons or a collection of images containing specific persons, and mailing it to these persons.

However, as a result of grouping a plurality of images according to specific persons, there is a possibility that images will be grouped in a manner unintended by the user who has grouped the images. For example, such grouped images may include (1) an image in which a specific person is contained, but the user feels that the facial expression of the person is not so good, and (2) an image in which a specific person is contained, but an unknown person is also depicted.

In such a case, after the images are grouped, the user needs to check and correct the grouping result while displaying the content of the images. This is a troublesome task for the user.

SUMMARY OF THE INVENTION

The present invention has been made in consideration of above problems, and has as its object to reduce the correction load on a user when a plurality of images are to be grouped.

In order to solve the above problems and achieve the above object, according to the first aspect of the present invention, there is provided an information processing apparatus which discriminates an object contained in a first image and groups the first image to a plurality of grouping destinations for each object, comprising a display unit adapted to display the first image and a second image indicating the grouping destination, a discrimination unit adapted to discriminate an object from the first image, a grouping destination determination unit adapted to determine, on the basis of the discrimination result obtained by the discrimination unit, to which one of the plurality of grouping destinations the first image is to be grouped, and a display control unit adapted to control the display unit to display, on a window of the display unit, a process of moving the first image to a position of the second image corresponding to the grouping destination determined by the grouping destination determination unit.

According to the second aspect of the present invention, there is provided an information processing method of discriminating an object contained in a first image and grouping the first image to a plurality of grouping destinations for each object, comprising a discrimination step of discriminating an object from the first image, a grouping destination determination step of determining, on the basis of the discrimination result obtained in the discrimination step, to which one of the plurality of grouping destinations the first image is to be grouped, and a display control step of displaying, on a window, a process of moving the first image to a position of the second image corresponding to the grouping destination determined in the grouping destination determination step.

A program according to the present invention is characterized by causing a computer to execute the above information processing method.

A storage medium according to the present invention is characterized by storing the above program.

Further features of the present invention will become apparent from the following description of exemplary embodiments with reference to the attached drawings.

BRIEF DESCRIPTION OF THE DRAWINGS

FIG. 7R is a view showing an example of a window to be displayed at the start of image grouping operation;

FIG. 7B is a view schematically showing an example of animation display at the time of image grouping;

FIG. 7C is a view schematically showing an example of animation display at the time of image grouping;

FIG. 8A is a view schematically showing an example of animation display at the time of image grouping;

FIG. 8B is a view schematically showing an example of animation display when a grouping destination is changed by the user at the time of image grouping;

DESCRIPTION OF THE EMBODIMENTS

The preferred embodiments of the present invention will be described in detail below with reference to the accompanying drawings.

First Embodiment

Figure 1:
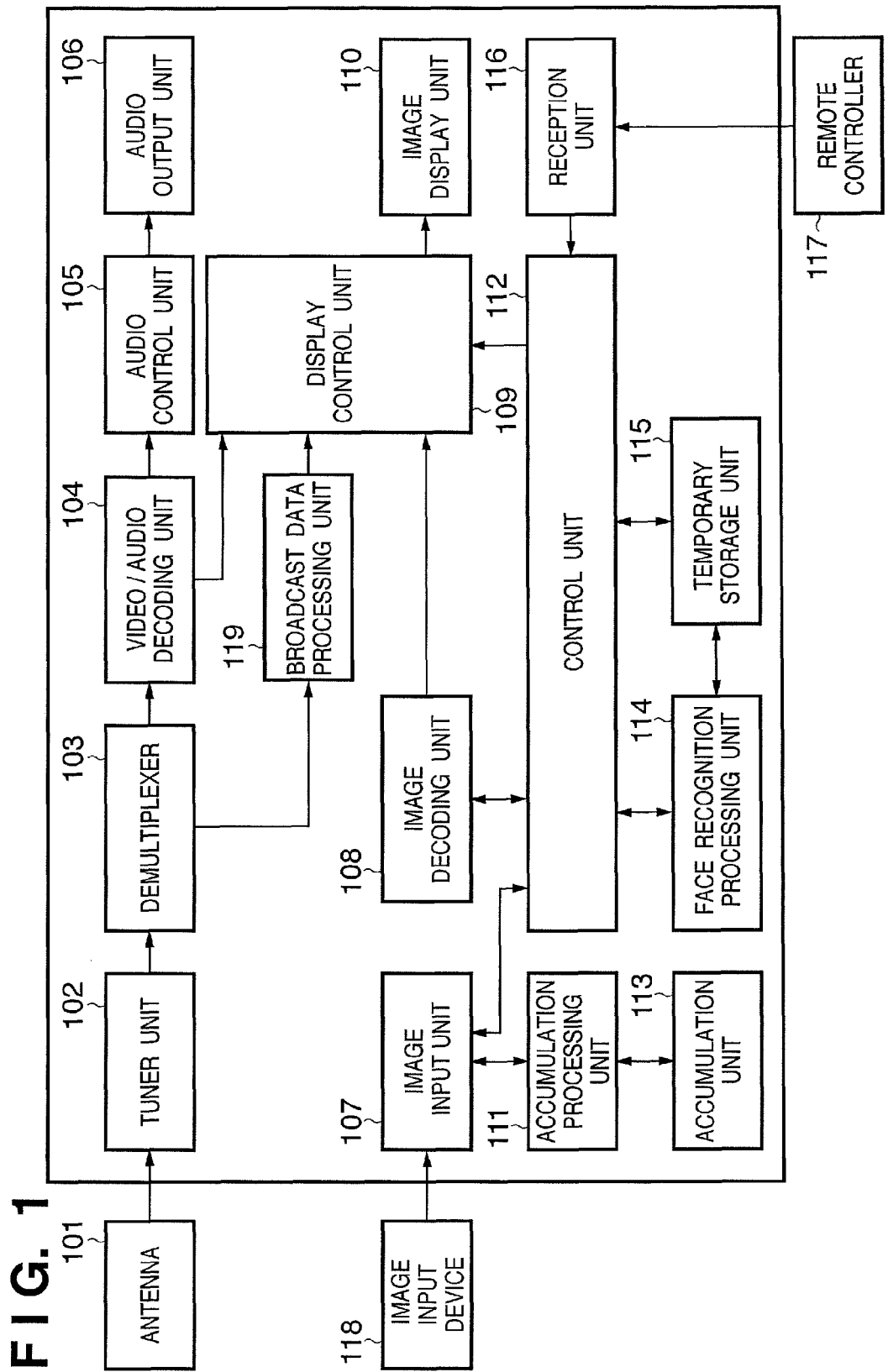
FIG. 1 is a block diagram showing an information processing apparatus according to an embodiment of the present invention.

FIG. 1 is a block diagram showing the arrangement of an information processing apparatus according to the first embodiment of the present invention.

Referring to FIG. 1, an information processing apparatus 100 has a television viewing function, receives a digital broadcast signal through an antenna 101, and displays, on an image display unit 110, a video, program information, or the like which is associated with the channel selected by a user with an instruction through a remote controller 117. In addition, audio data is output to an audio output unit 106 through an audio control unit 105.

The information processing apparatus 100 further includes a function of acquiring and accumulating an image group including still and moving images from a DSC (Digital Still Camera), DVC (Digital Video Camera), a memory card, or the like which is connected as an image input device 118. In addition, this apparatus includes a function of displaying these images on the image display unit 110.

Figure 2:
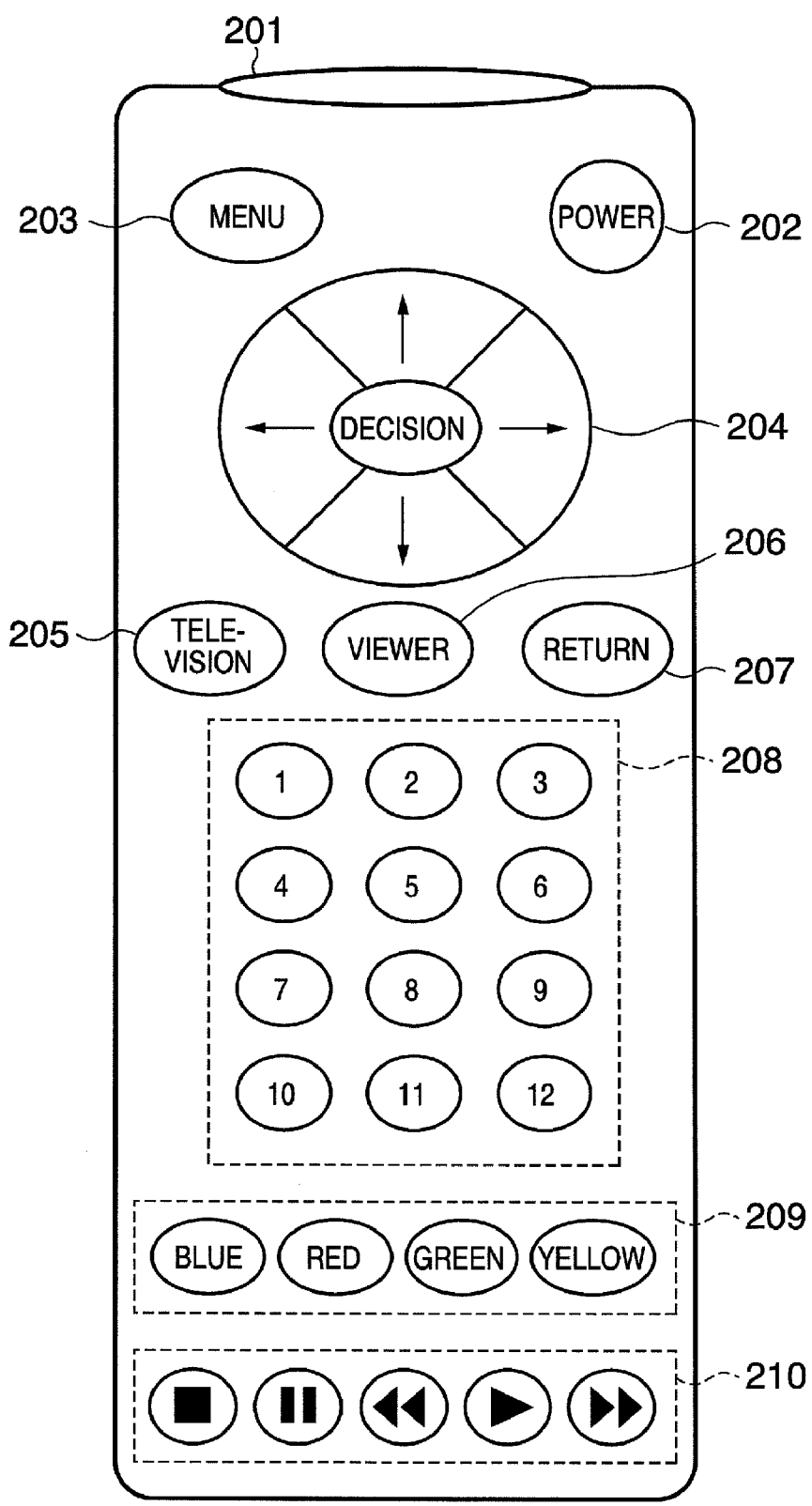
FIG. 2 is a view showing a remote controller of the information processing apparatus according to the embodiment of the present invention.

FIG. 2 is a view showing an example of the remote controller 117 of the information processing apparatus 100. Note, however, that FIG. 2 shows only the keys which are used to perform necessary operation for the description of this embodiment.

Referring to FIG. 2, reference numeral 201 denotes a transmission unit for performing infrared communication between the remote controller 117 and a reception unit 116; 202, a "power" key for turning on/off the power supply of the information processing apparatus 100; 203, a "menu" key which is used to display function items of the functions of the information processing apparatus 100 which the user can select; 204, a "cursor & decision" key having a decision key located in the center of the up, down, left, and right keys; 205, a "television" key 205 which is used to set the information processing apparatus 100 in a television viewing state; 206, a "viewer" key for displaying and erasing an image list display window to be described later; 207, a "return" key which is mainly used to return the window display state to the previous state; 208, a "numeral" key pad on which the numerals from 1 to 12 are arranged in the form of a matrix; 209, four "color" keys on which the colors "blue", "red", "green", and "yellow" mainly used for television data broadcast operation are arranged; and 210, "playback control" keys which are mainly used for display control on moving images and are used to "stop", "pause", "rewind", "play back", and "fast forward" moving images.

The user can determine the operation of the information processing apparatus 100 by operating the above various keys.

(Information Processing Apparatus: Television Viewing Function)

Referring to FIG. 1, a signal received by the antenna 101 is input to a tuner unit 102. The tuner unit 102 generates digital data in a form called a transport stream (TS) by performing processing such as demodulation and error correction for the input signal, and outputs the data to a demultiplexer 103. A TS contains videos and audio data corresponding to a plurality of channels, electronic program guide (EPG) data, data of data broadcast, and the like in a time division multiplex form.

The demultiplexer 103 extracts video data and audio data from the input TS, and outputs them to a video/audio decoding unit 104. The demultiplexer 103 also extracts EPG data and data of data broadcast from the input TS and outputs them to a broadcast data processing unit 119.

The video data processed by the video/audio decoding unit 104 is displayed on the image display unit 110 through a display control unit 109. The audio data is output to the audio control unit 105 and is output as audio from the audio output unit 106.

The EPG data and data of data broadcast processed by the broadcast data processing unit 119 are displayed on the image display unit 110 through the display control unit 109.

(Information Processing Apparatus: Image Display Function)

The information processing apparatus 100 has a function of displaying, on the image display unit 110, images from the connected image input device 118 and an accumulation unit 113. A case wherein images from the image input device 118 are displayed will be described below.

Figure 3A:
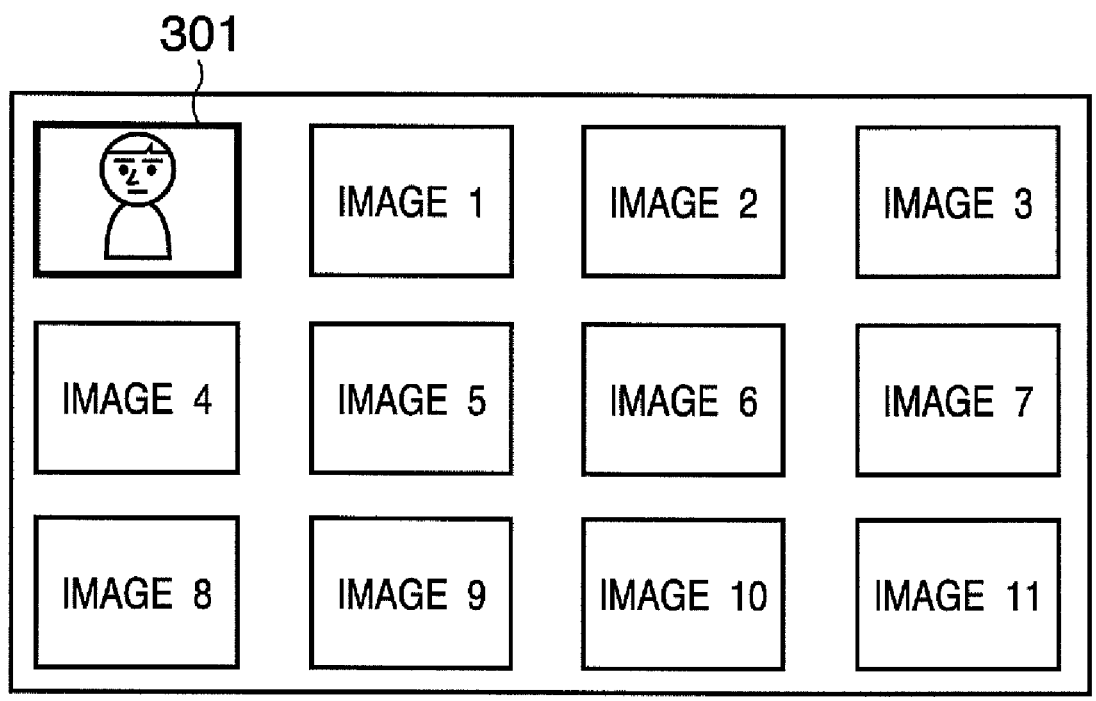
FIG. 3A is a view showing an example of image list display.
Figure 3B:
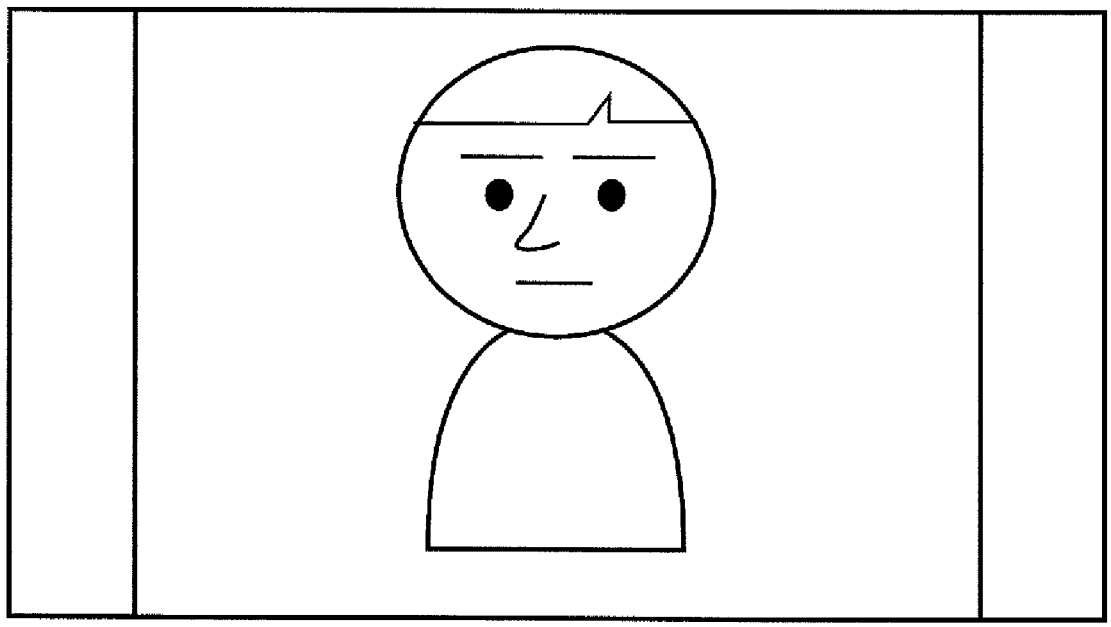
FIG. 3B is a view showing an example of image display.

FIG. 3A is a view showing an example of an image list displayed on the image display unit 110 by using the image display function. FIG. 3B is a view showing an example of the display of an image selected and displayed from the image list in FIG. 3A in accordance with a selection instruction from the user.

An image input unit 107 is an interface for capturing an image from the image input device 118 into the information processing apparatus 100. The image input unit 107 can take various forms depending on the type of the image input device 118. If, for example, the image input device 118 is a DSC, the image input unit 107 is a USB or wireless LAN. If the image input device 118 is a DVC, the image input unit 107 is a USB, IEEE1394, or wireless LAN. If the image input device 118 is a memory card, the image input unit 107 is a PCMCIA interface or an interface unique to the memory card. The image input unit 107 outputs a connection detection event to a control unit 112 upon detecting that the image input device 118 is connected.

Upon detecting the device connection detection event, the control unit 112 acquires the total count information of images in the image input device 118, and stores it in a temporary storage unit 115. The temporary storage unit 115 then acquires the first image data, extracts a thumbnail image contained in the data, and performs JPEG decoding processing (decodes) by using an image decoding unit 108. If no thumbnail image is contained in the image data, the control unit 112 decodes and reduces the image data itself to generate a thumbnail image.

Subsequently, the control unit 112 sends display data to the display control unit 109, together with the designations of a display position and display size, thereby displaying the thumbnail image. Likewise, the control unit 112 repeatedly processes the second image, the third image, ..., and displays the image list shown in FIG. 3A.

FIG. 3A shows a state wherein 12 images of the images from the image input device 118 are displayed as a list in a matrix of 4 rows×3 columns.

Referring to FIG. 3A, reference numeral 301 denotes a selection cursor with which the user selects a desired image from an image list. The user can move the cursor 301 by using the up, down, left, and right keys of the "cursor & decision" key 204 of the remote controller 117.

When the user presses the decision key, the control unit 112 displays the image on which the cursor 301 is positioned on the image display unit 110 through the display control unit 109, as shown in FIG. 3B. In this case, the image decoding unit 108 performs JPEG decoding (decodes) for the selected image data. Thereafter, the control unit 112 sends display data to the display control unit 109, together with designations of a display position and display size, thereby displaying the image.

(Information Processing Apparatus: Personal Feature Registration Function)

The information processing apparatus 100 has a personal feature registration function of detecting the face of a person as an object from an image, and storing the facial feature information in association with the person's name and the like input by the user.

The personal feature registration function will be described below with reference to the accompanying drawings.

Figure 3C:
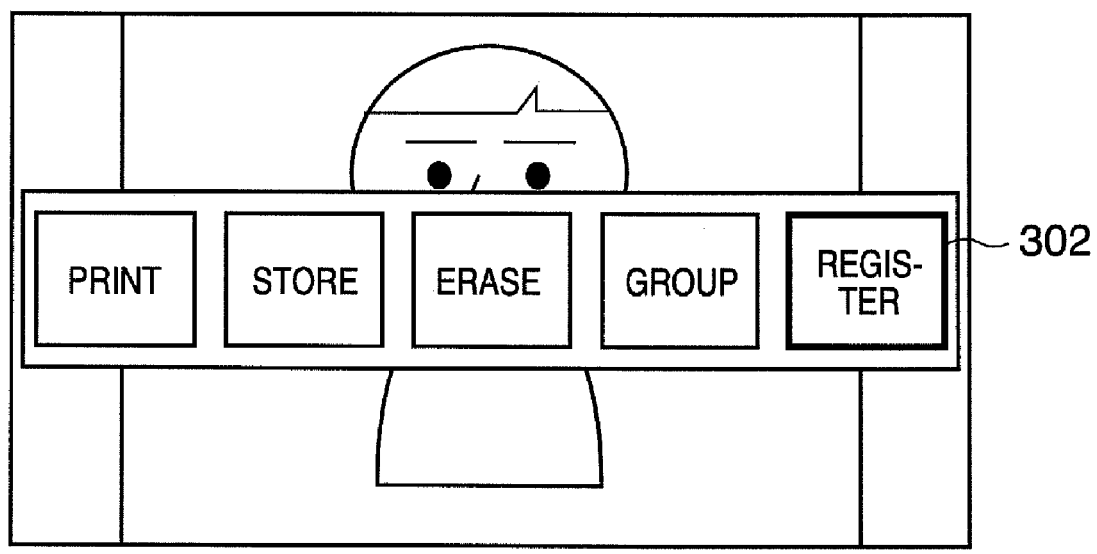
FIG. 3C is a view showing an example of function menu display.

In the display state shown in FIG. 3B, when the user presses the "menu" key 203 of the remote controller 117, a function selection menu 302 containing a selection item for the start of the personal feature registration function is displayed. FIG. 3C shows an example of this display. In the display state shown in FIG. 3C, the user selects "register" as the selection item for the start of the personal feature registration function by using the "cursor & decision" key 204 of the remote controller 117.

Upon receiving the selection information from the user, the control unit 112 starts the operation of detecting the face of a person as an object and storing the facial feature information of the detected face in association with the person's name and the like in cooperation with the image decoding unit 108, a face recognition processing unit 114, and the like.

Figure 4:
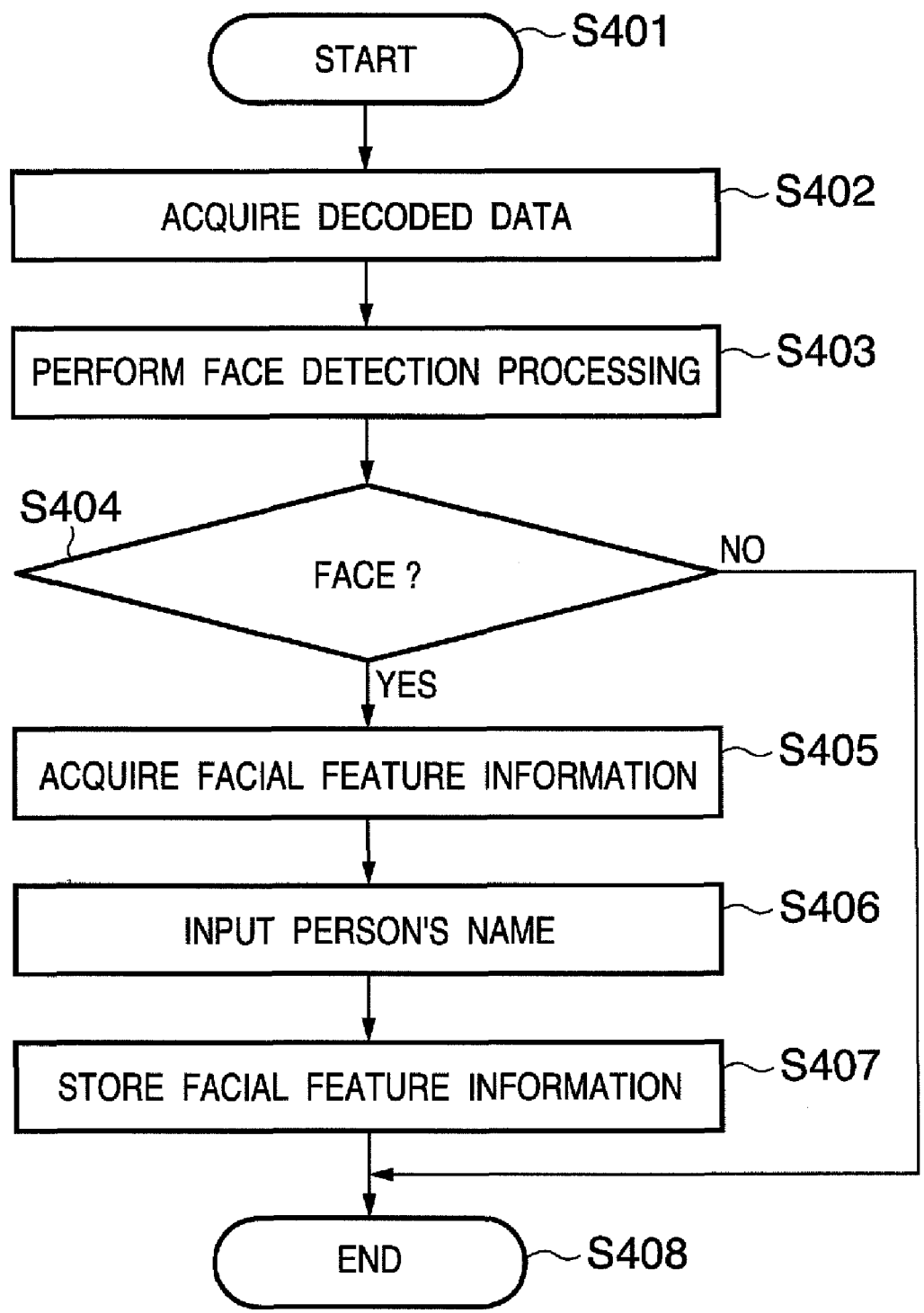
FIG. 4 is a flowchart showing an example of processing operation by a personal feature registration function.

FIG. 4 is a flowchart showing the procedure of this operation.

(S401: Start of Operation)

The control unit 112 starts the operation.

(S402: Acquisition of Decoded Data)

The control unit 112 acquires the decoded data of a currently displayed image from the image decoding unit 108, and transfers the data to the face recognition processing unit 114.

(S403: Face Detection Processing)

The face recognition processing unit 114 performs face detecting operation for the person contained in the received data. As an example of the face detecting operation, operation is performed by the method disclosed in the following reference:

"Laurenz Wiskott, Jean-Marc Fellous, Norbert Kruger, and Christoph von der Malsburg, "Face Recognition by Elastic Bunch Graph Matching" IEEE Trans. on Pattern Analysis and Machine Intelligence, vol. 19, no. 7, pp. 775-779, 1997"

First of all, wavelet transformation is performed for the image data to detect the contour of a face image. That is, a face graph comprising a small number of nodes is applied to the image data, and wavelet transformation is performed to detect a face area (a graph indicating a facial feature). In addition, the face recognition processing unit 114 corrects the size and inclination on the basis of the detected face area, and generates a face graph (to be referred to as facial feature information hereinafter) comprising a large number of nodes including the positions of organs (eyes, mouth, and the like) constituting the face by using wavelet transformation.

(S404: Discrimination of Face Detection Result)

On the basis of the face detection processing result, the control unit 112 performs branching of processing depending on whether a face area exists. The face detection processing result includes the count information of detected faces. If a face area exists, the process shifts to step S405. If no face area exists, the process shifts to step S408.

(S405: Acquisition of Facial Feature Information)

The control unit 112 acquires the facial feature information from the face recognition processing unit 114.

(S406: Inputting of Person's Name)

The control unit 112 displays, on the image display unit 110, a software keyboard window which allows the user to input characters by using the remote controller 117.

The user inputs a person's name to be associated with the facial feature information acquired in the previous step by using the "cursor & decision" key 204 of the remote controller 117 while viewing the software keyboard window. If, for example, the displayed image is an image of the user himself/ herself as an object as shown in FIG. 3B, the user may input "me" or his/her name. If the displayed image is a user's acquaintance, the user may input the name or nickname of the acquaintance.

(S407: Storage of Facial Feature Information)

The control unit 112 stores the facial feature information in association with the person's name information in the accumulation unit 113 and individual ID information for individual identification. Individual ID information is a unique number in the information processing apparatus 100. Such pieces of information are provided in the order they were stored.

(S408: End of Operation)

The control unit 112 terminates the operation of the personal feature registration function.

The pieces of facial feature information of a plurality of persons can be registered in the information processing apparatus 100 in advance by executing the above personal feature registration function for each of images of different persons as objects.

(Information Processing Apparatus: Image grouping Function)

The information processing apparatus 100 has a function of grouping a plurality of images in the image input device 118 while displaying the process of grouping the images for the respective persons as objects. This embodiment is configured such that when the process of grouping is displayed, the manner of transferring (moving) images as grouping targets to the corresponding grouping destinations is displayed by animation (moving images).

An image grouping function in this embodiment will be described below with reference to the accompanying drawings.

If, for example, the user presses the "menu"; key 203 of the remote controller 117 in the display state shown in FIG. 3A, a function selection menu 303 including a selection item for the start of the image grouping function is displayed.

Figure 3D:
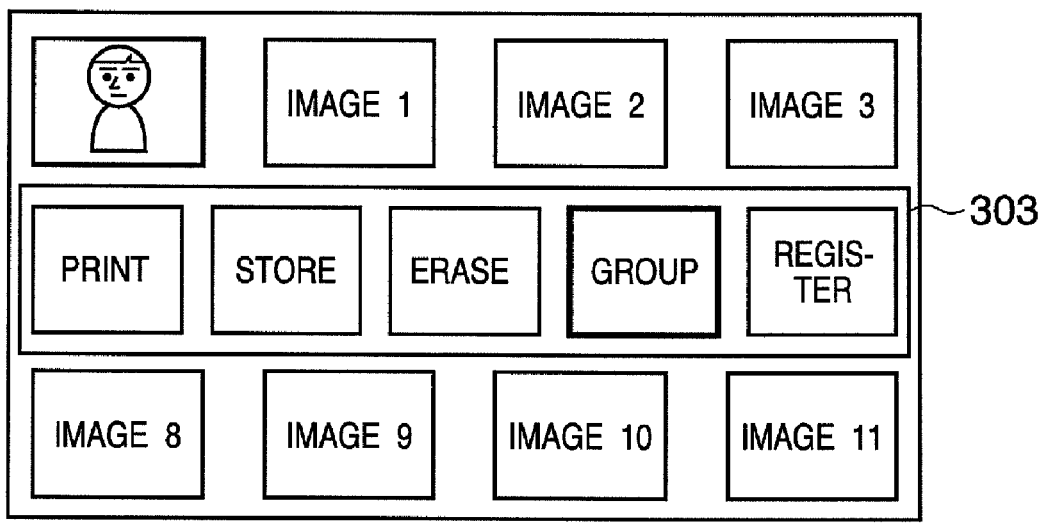
FIG. 3D is a view showing an example of function menu display.

FIG. 3D shows an example of this display. In the display state in FIG. 3D, the user selects "group" as the selection item for the start of the image grouping function by using the "cursor & decision" key 204 of the remote controller 117. When the user selects "group", a person selection list which allows the user to arbitrarily select a person for which grouping is to be performed is displayed.

Figure 3E:
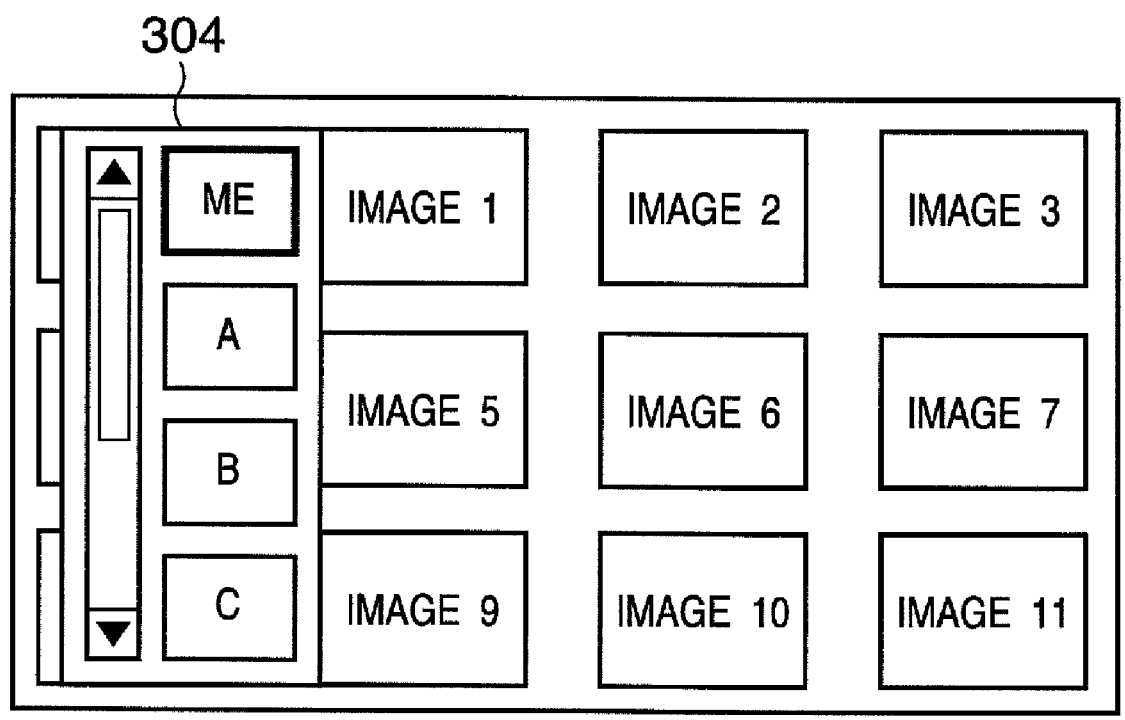
FIG. 3E is a view showing an example of person selection list display.

FIG. 3E shows an example of this display. A person list 304 displays the names of persons which are input by the above personal feature registration function. When the user completes selection of a desired person from the person list 304 by using the "cursor & decision" key 204 of the remote controller 117, the information processing apparatus 100 starts the grouping operation of images.

Assume that in the following description, three persons, namely "me", "A", and "B", are selected from the person list 304.

Figure 5:
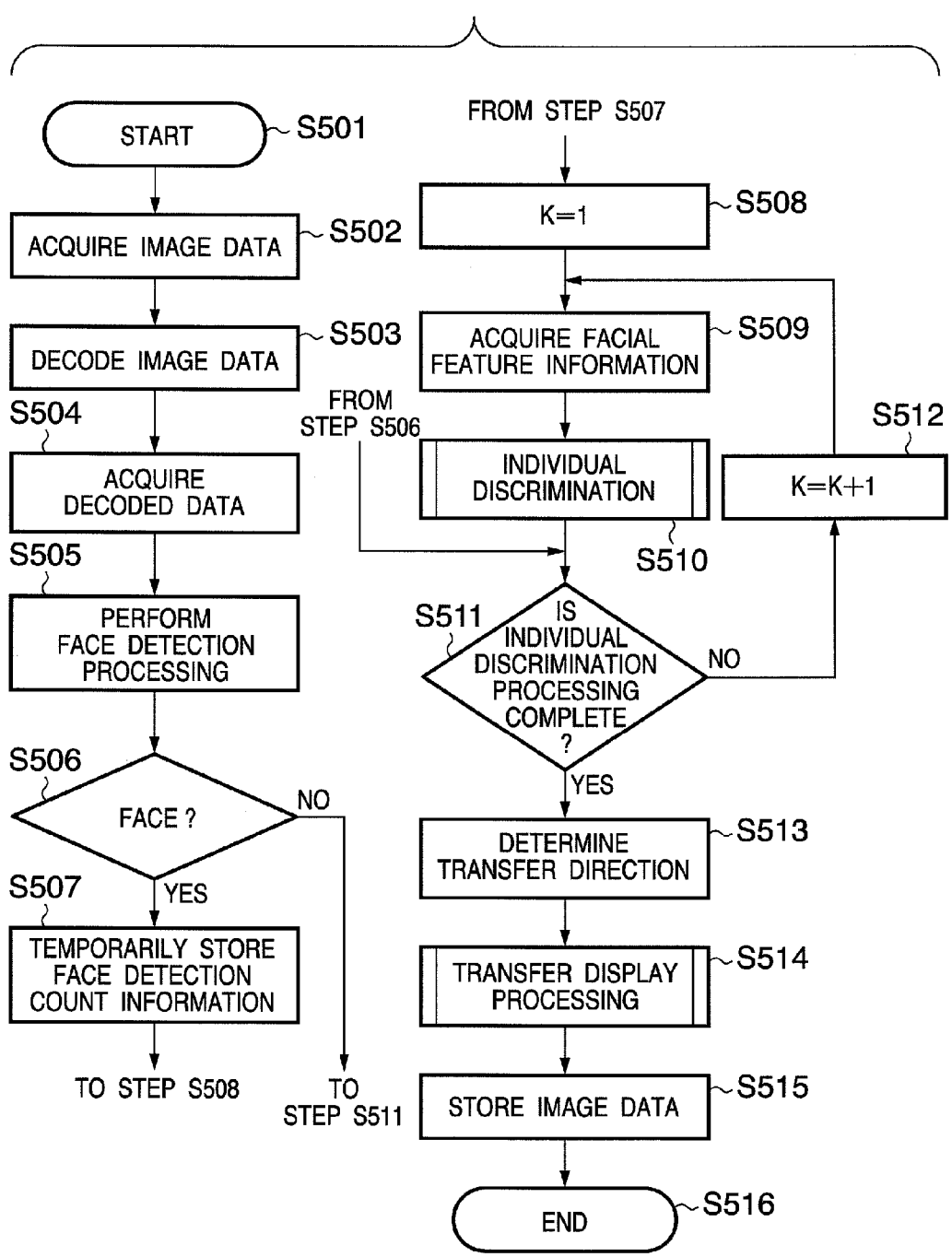
FIG. 5 is a flowchart showing an example of image grouping operation.

FIG. 5 is a flowchart showing the procedure of image grouping operation which the control unit 112 performs in cooperation with the image decoding unit 108, the face recognition processing unit 114, and the like.

Figure 6:
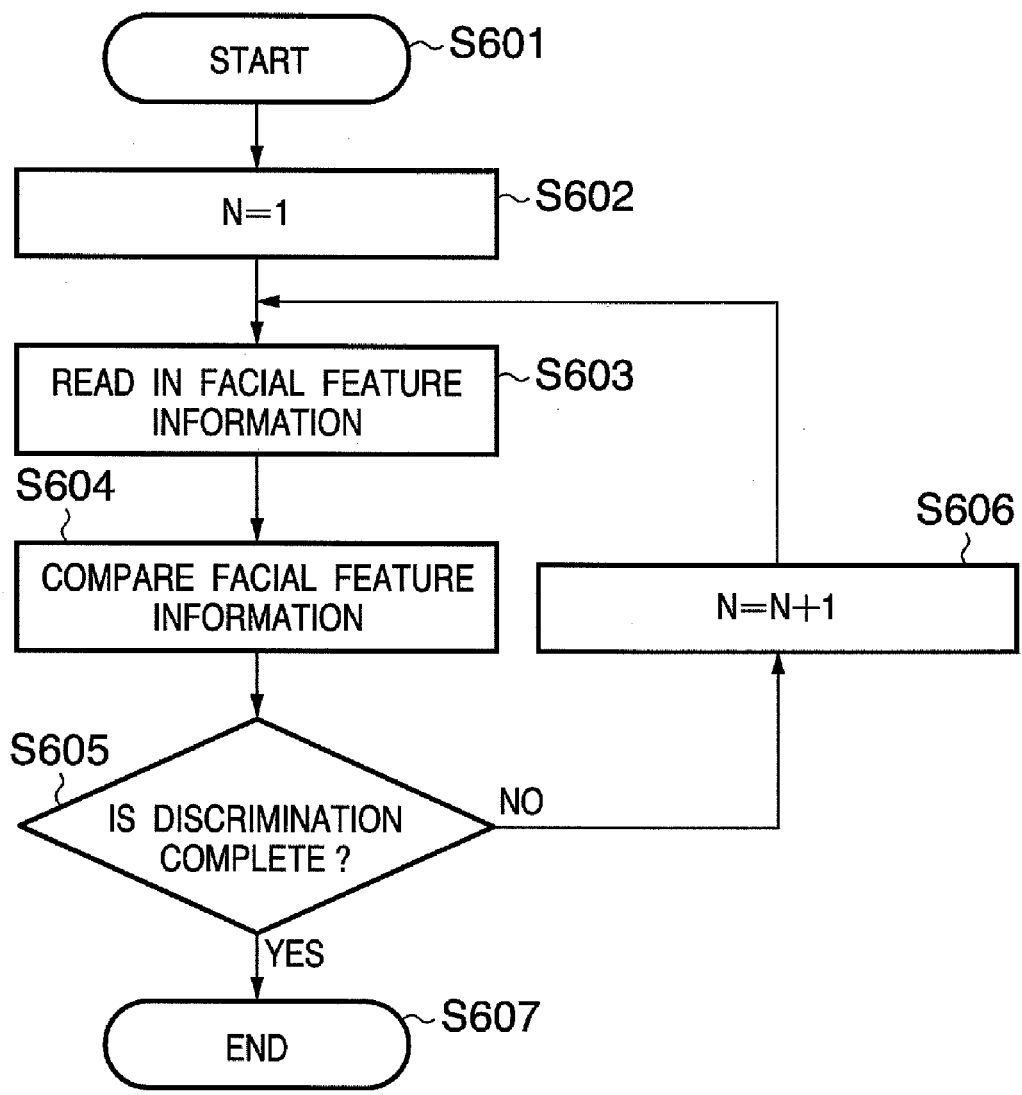
FIG. 6 is a flowchart showing an example of person discriminating operation.

FIG. 6 is a flowchart showing the procedure of person discriminating operation for objects which the control unit 112 performs in cooperation with the image decoding unit 108, the face recognition processing unit 114, and the like.

FIG. 7A shows an example of a window to be displayed when image grouping operation is started.

The procedure of image grouping operation in FIG. 5 will be described first.

(S501: Start of Operation)

First of all, the control unit 112 starts image grouping operation for one image. When this operation starts, a window like that shown in FIG. 7A is displayed.

Referring to FIG. 7A, reference numeral 701 denotes an image to be grouped; and 702 to 705, grouping destinations of images. Reference numerals 702, 703, and 704 respectively denote the grouping destinations of images containing "me", "A", and "B" as objects selected from the person list 304; and 705, the grouping destination of images of persons other than those selected from the person list 304 or of images on which it is determined that no person is depicted. Note that the grouping destinations 702 to 705 are colored on the display. In this embodiment, the designation groups 702, 703, 704, and 705 are colored in "blue", "red", "green", and "yellow", respectively.

(S502: Acquisition of Image Data)

The control unit 112 acquires the image data of the grouping target image 701 and transfers it to the image decoding unit 108.

(S503: Image Data Decoding)

The image decoding unit 108 performs JPEG decoding processing (decodes) the received image data.

(S504: Acquisition of Decoded Data)

The control unit 112 acquires the decoded data from the image decoding unit 108.

(S505: Face Detection Processing)

The face of a person is detected from the image by the same processing as that described in step S403 in FIG. 4.

(S506: Discrimination of Face Detection Result)

On the basis of the face detection processing result, the control unit 112 performs branching of processing depending on whether a face area exists. The face detection processing result includes the count information of detected faces. If a face area exists, the process shifts to step S507. If no face area exists, the process shifts to step S511.

(S507: Temporary Storage of Count Information of Detected Faces)

The control unit 112 temporarily stores the number of detected faces as a result of the face detection processing in the temporary storage unit 115.

(S508: Setting of Initial Value to Variable)

The control unit 112 sets "1" indicating the head of a sequence to a variable K indicating a processing sequence corresponding to the number of faces temporarily stored in the previous step.

(S509: Acquisition of Facial Feature Information)

The control unit 112 acquires facial feature information from the face recognition processing unit 114.

(S510: Individual Discrimination)

The control unit 112 performs individual discrimination processing on the basis of the facial feature information acquired from the face recognition processing unit 114 and the facial feature information stored in the accumulation unit 113 by the personal feature registration function. The procedure of this operation will be described with reference to FIG. 6.

(S601: Start of Operation)

The control unit 112 starts operation in individual discrimination processing.

(S602: Setting of Initial Value to Variable)

The control unit 112 sets "1" indicating the head of a sequence to a variable N indicating a processing sequence of individual discrimination processing. In this embodiment, since the three persons, i.e., "me", "A", and "B", have been selected as image grouping destinations, the maximum value of N is 3. In addition, a processing sequence is determined on the basis of individual ID information assigned by the personal feature registration function. Assume that in this embodiment, N=1, N=2, and N=3 indicate the processing sequence of "me", "A", and "B", respectively.

(S603: Reading in of Facial Feature Information)

The control unit 112 acquires the facial feature information of a person corresponding to the variable N from the accumulation unit 113. In the description of this embodiment, the control unit 112 reads in the facial feature area information of "me" first.

(S604: Facial Feature Information Comparison)

The control unit 112 compares the facial feature information acquired from the face recognition processing unit 114 with the facial feature information read in from the accumulation unit 113. If the facial feature information comparison result indicates that the difference is equal to or less than a threshold, the control unit 112 determines that a specific person can be identified. If the difference is equal to or more than the threshold, the control unit 112 determines that no specific person can be identified.

(S605: Discrimination of Whether Discrimination Processing is Complete)

The control unit 112 discriminates whether all pieces of facial feature information are completely compared with each other. If the comparison is complete, the process shifts to step S607. If the comparison is not complete, the process shifts to step S606. In this embodiment, when the pieces of feature information of "me", "A", and "B" are completely compared with each other, the process shifts to step S607.

(S606: Increment of Variable N)

The control unit 112 adds "1" to the variable N indicating the processing sequence.

(S607: End of Operation)

The control unit 112 terminates the operation in the individual discrimination processing.

If the individual discrimination processing in step S510 is completed by the above operation in steps S601 to S607, the process returns to step S511 in FIG. 5.

(S511: Discrimination of Whether Individual Discrimination Processing is Complete)

The control unit 112 discriminates whether individual discrimination processing corresponding to the number of faces temporarily stored in the previous step is complete. If this processing is not complete, the process shifts to step S512. If the processing is complete, the process shifts to step S513.

(S512: Increment of Variable K)

The control unit 112 adds "1" to the variable K indicating the processing sequence.

(S513: Determination of Transfer Direction)

The control unit 112 determines the grouping designation and transfer direction of the image on the basis of the individual discrimination processing result. The individual discrimination processing result includes information indicating whether a specific person could be discriminated and the individual ID information of a person who could be discriminated.

If, for example, it is discriminated that the grouping target image 701 in FIG. 7A is an image of "A" as an object, it is determined that the image is to be transferred (moved) to the direction of the grouping destination 703 of "A".

Likewise, if the grouping target image is an image of "me" as an object, it is determined that the image is to be transferred (moved) to the grouping designation 702 of "me" If the grouping target image is an image of "B" as an object, it is determined that the image is to be transferred (moved) to the grouping designation 704 of "B".

If the grouping target image is an image other than images of "me", "A", and "B" or an image in which no person is depicted, it is determined that the image is to be transferred (moved) to the grouping destination 705 of "others".

If the grouping target image 701 is an image including a plurality of persons as objects, for example, an image including "A" and "B" as objects, it is determined that the image is to be transferred (moved) to both the grouping designation 703 of "A" and the grouping destination 704 of "B". This applies to a case where three or more persons are objects.

(S514: Transfer Display Processing)

The control unit 112 sends the display data of a thumbnail image of the grouping target image 701 to the display control unit 109 together with the designations of a display position and display size, and displays the manner of transferring (moving) the grouping target image to its grouping destination by animation (moving images).

FIG. 7B is a view schematically showing an example of the animation display.

Referring to FIG. 7B, reference numeral 706A denotes the display position of the grouping target image 701 at time t1; 706B, the display position of the grouping target image 701 at time t2; 706C, the display position of the grouping target image 701 at time t3; 706D, the display position of the grouping target image 701 at time t4; and 709, an arrow schematically indicating the transfer (moving) direction of the image, which is not actually displayed on the window.

The control unit 112 controls the display control unit 109 with the lapse of time to display the grouping target image at the position 706A at time t1. At time t2, the control unit 112 performs control to erase the display at the position 706A and display the image at the position 706B. Repeating the above display control until the image reaches the grouping destination 703 makes it possible to display the manner of transferring (moving) the grouping target image to its grouping destination by animation.

For the sake of descriptive convenience, FIG. 7B has exemplified the four display positions 706A to 706D of the grouping target image. In practice, if display transfer is performed more finely, the manner of smoothly transferring an image can be displayed to the user by animation.

FIG. 7C is a view schematically showing animation display when a grouping target image includes two objects, i.e., "A" and "B".

The control unit 112 performs control to display a grouping target image on the display control unit 109 at positions 707A and 708A at time t1 with the lapse of time. At time t2, the control unit 112 performs control to erase the displays at the positions 707A and 708A and display the image at positions 707B and 708B. Repeating the above display control until the image reaches the grouping destinations 703 and 704 makes it possible to display the manner of transferring the grouping target image to its grouping destinations by animation.

(S515: Storage of Image Data)

The control unit 112 stores the data of the image which has reached the grouping destinations in accumulation areas discriminated in the accumulation unit 113 for the respective grouping destinations.

(S516: End of Operation)

The control unit 112 terminates image grouping operation for one image.

The control unit 112 can group and store all the images in the image input device 118 for the respective persons as objects by repeatedly executing the operation procedures in FIGS. 5 and 6 for the subsequent grouping targets.

(Information Processing Apparatus: Image Grouping Destination Changing Function)

The information processing apparatus 100 also has an image grouping destination changing function of changing a grouping destination during transfer display processing of a grouping target image in the above image grouping function on the basis of an operation instruction issued by the user through the remote controller 117.

This embodiment will exemplify a method of changing grouping destinations by designating a grouping destination before a change and a grouping destination after the change by using the "color" keys 209 of the remote controller 117.

FIG. 8A is a view schematically showing a display position 802A of a grouping target image 801 at time t5 during transfer display processing. Reference numeral 803 denotes an arrow which schematically shows the transfer direction of an image but is not actually displayed on the window.

When the user presses the "color" keys 209 of the remote controller 117 in the display state in FIG. 8A, the control unit 112 receives the corresponding operation instruction through the reception unit 116.

The control unit 112 further discriminates the color of the pressed "color" key, i.e., which one of the "blue", "red", "green", and "yellow" keys is pressed, and identifies the grouping destination before the change first. The control unit 112 identifies the grouping destination before the change so as to match the display color of the grouping destination with the color of the pressed "color" key.

When the user presses the "color" keys 209 of the remote controller 117 again, the control unit 112 receives the corresponding operation instruction through the reception unit 116.

In addition, the control unit 112 discriminates the pressed "color" key, and identifies the grouping destination after the change. The control unit 112 identifies the grouping destination after the change so as to match the display color of the grouping destination with the color of the pressed "color key".

For example, FIG. 8B schematically shows animation display when the user sequentially presses the green and yellow "color" keys. Reference numeral 802B denotes a display position at time t6; 802C, a display position at time t7; and 804, an arrow which schematically shows a change in the transfer direction of the image but is not actually displayed on a window.

Since the control unit 112 detects that the green and yellow "color" keys are pressed at time t5, the control unit 112 determines that the grouping destination is to be changed from the grouping destination 704 to the grouping destination 705. The control unit 112 then controls the display control unit 109 with the lapse of time to erase the display at the position 802A and display the image at the position 802B at time t6. At time t7, the control unit 112 performs control to erase the display at the position 802B and display the grouping target image at the position 802C. Repeating the above display control until the image reaches the grouping destination 705 makes it possible to display the manner of transferring the image to the changed grouping destination by animation.

Likewise, when the green and blue "color" keys are sequentially pressed, it is determined that the grouping destination is changed to the grouping destination 702. This operation can also be displayed by animation. When the green and red "color" keys are sequentially pressed, it is determined that the grouping destination is to be changed to the grouping destination 703. This operation can also be displayed by animation.

(Effect)

As described above, persons as objects of grouping target images are discriminated by the image grouping function based on the facial feature information registered by the personal feature registration function, and the images are grouped for the respective persons. Displaying this process by animation makes it possible for the user to change a grouping destination to a desired grouping destination and group the images with simple operation while checking the facial expressions of object persons in the grouping target images during display. This can therefore eliminate the necessity to manually correct the grouping result and reduce the correction load on the user.

When the "pause" key of the "playback control" keys 210 of the remote controller 117 is pressed, the control unit 112 temporarily stops animation display by temporarily stopping display control on the display control unit 109. When the "pause" key is pressed again, the control unit 112 resumes animation display by resuming display control on the display control unit 109. According to these control operations, the time taken for checking the contents of grouping target images can be arbitrarily adjusted, thereby making the embodiment more effective.

Second Embodiment

The second embodiment of the present invention will be described below with reference to the accompanying drawings.

The arrangement of an image display apparatus to which the second embodiment is applied is the same as that of the first embodiment shown in FIG. 1.

The second embodiment is equivalent to the first embodiment except that the second embodiment additionally includes the processing of determining the speed at which a grouping target image is to be transferred to its grouping destination on the basis of the number of faces detected in the grouping target image. Assume that in the following description, a transfer speed in the second embodiment is the number of pixels by which an image is transferred in one sec.

An image grouping function in the second embodiment will be described below.

(Information Processing Apparatus: Image Grouping Function)

Figure 9:
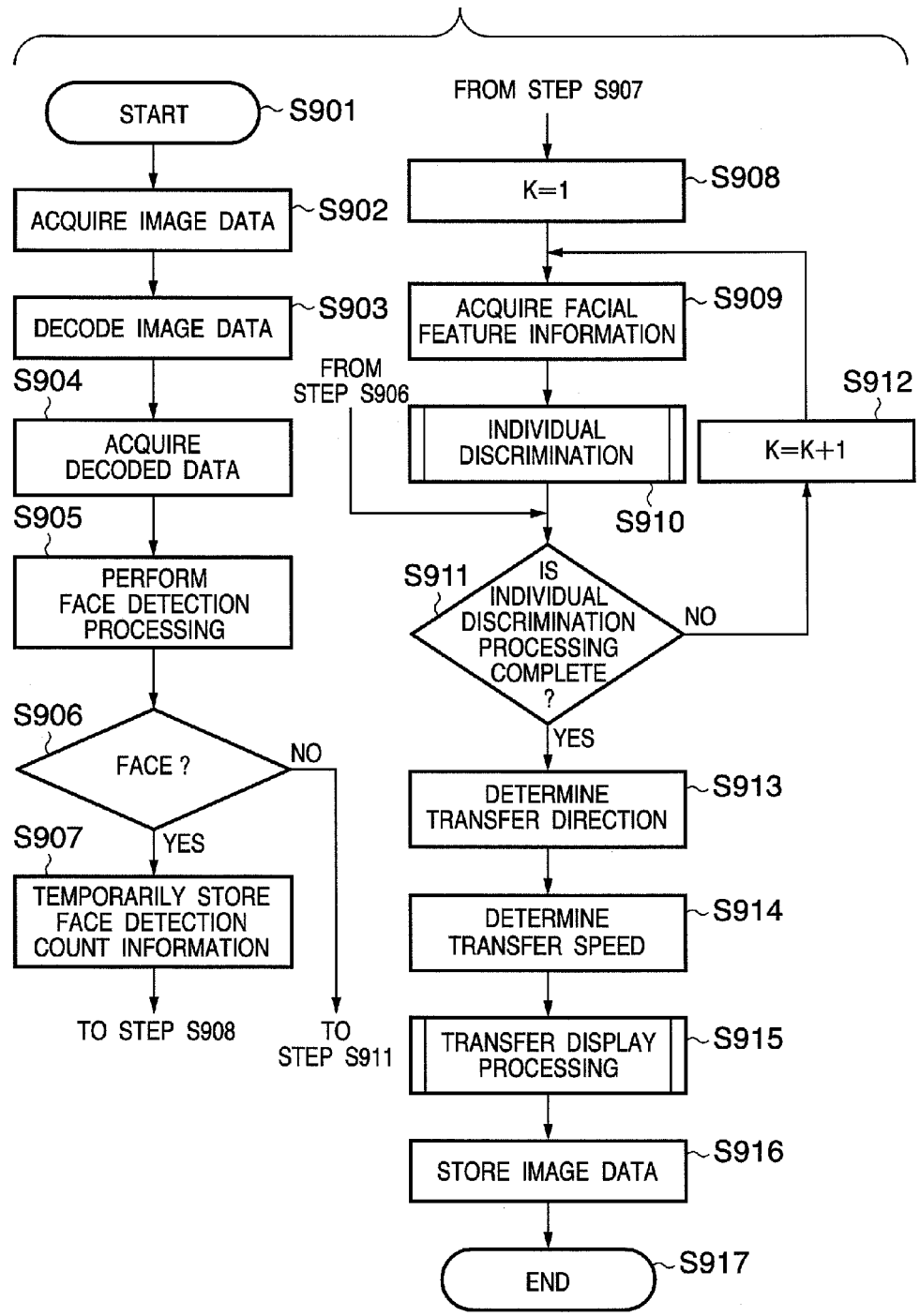
FIG. 9 is a flowchart showing an example of image grouping operation.

FIG. 9 is a flowchart showing the sequence of image grouping operation which is performed by a control unit 112 in cooperation with an image decoding unit 108, a face recognition processing unit 114, and the like.

The operation procedure of image grouping operation will be described with reference to FIG. 9.

Since the processing in steps S901 to S913 is the same as that in steps S501 to S513 in FIG. 5, a description thereof will be omitted.

(S914: Determination of Transfer Speed)

The control unit 112 determines the speed at which a grouping target image is to be transferred to a grouping destination on the basis of the face detection count information of the grouping target image which is a face detection processing result.

For example, the transfer speed (P pixels per second) is determined according to equation (1) given below with reference to a transfer speed set when the number of faces detected in the grouping target image is 1:

$$\text{transfer speed to grouping destination} = P/\text{number of faces detected in grouping target image} \quad (1)$$

According to equation (1), as a grouping target image contains a larger number of detected faces, the transfer speed can be decreased. This allows the user to thoroughly check the facial expression of each person and whether any unknown person is contained in the grouping target image, even if many persons are contained in the grouping target image.

The processing in steps S915 to S917 is the same as that in steps S514 to S516 in FIG. 5, and hence a description thereof will be omitted.

This embodiment has exemplified the case wherein the transfer speed is determined according to equation (1). However, this embodiment may be configured such that the transfer speed is determined by another mathematical expression or referring to table information associating the numbers of faces detected and transfer speeds.

(Effect)

As described above, a person as an object of a grouping target image is discriminated and grouped for each person by the image grouping function based on facial feature information registered by the personal feature registration function. When this process is to be displayed by animation, an image transfer speed is determined on the basis of the number of faces detected in a grouping target image.

This allows the user to thoroughly check the facial expression of each person and whether any unknown person is contained in the grouping target image, during animation display, even if many persons are contained in the grouping target image. In addition, the grouping destination of a given image can be changed to a desired grouping destination during animation display by simple user operation. This can therefore eliminate the necessity to manually correct the grouping result and reduce the correction load on the user.

Third Embodiment

The third embodiment of the present invention will be described below with reference to the accompanying drawings.

The arrangement of an image display apparatus to which the third embodiment is applied is the same as that of the first embodiment shown in FIG. 1.

The third embodiment exemplifies the processing of determining the speed at which a grouping target image is transferred to a grouping destination on the basis of a matching level indicating how much the facial feature information of a person as an object of the grouping target image matches the facial feature information of a person registered by the personal feature registration function.

Four matching levels, i.e., level 0 to level 3, are set in the third embodiment. Level 0 indicates that no specific person can be identified. Of the levels indicating that a person can be identified, level 1 corresponds to the lowest matching level, and level 3 corresponds to the highest matching level.

The operation of an image grouping function in the third embodiment will be described below with reference to FIG. 9.

(Information Processing Apparatus: Image Grouping Function)

The processing in steps S901 to S913 is the same as that in steps S501 to S513 in FIG. 5, and hence a description thereof will be omitted.

(S914: Determination of Transfer Speed)

A control unit 112 determines a transfer speed to a grouping destination on the basis of face detection count information of a grouping target image as a result of face detection processing and a matching level fox each face as a result of individual discrimination processing.

First of all, the control unit 112 determines a matching level for each detected face.

The matching level is determined on the basis of the difference obtained as a result of the facial feature information comparison described with reference to step S604 in FIG. 6. Such differences which are equal to or less than a threshold are categorized into three levels. The smaller the difference, the higher the matching level. Assume that when the difference obtained as a result of feature information comparison is equal to or larger than the threshold, level 0 (individual discrimination has failed) is determined.

In addition, a coefficient (matching level coefficient) used for determining a transfer speed is assigned for each matching level. In this embodiment, level 0 corresponds to coefficient=0; level 1, coefficient=1; level 2, coefficient=2; and level 3, coefficient=3.

The transfer speed (P pixels per second) is then determined according to equation (2) with reference to a transfer speed set when the number of faces detected in the grouping target image is 1:

$$\text{transfer speed to grouping destination} = P\left(\frac{1}{n}\sum_{K=1}^{n}\frac{CK}{3n}\right) \quad (2)$$

where n is the number of faces detected, K is a variable indicating a processing sequence in step S908 in FIG. 9, and CK is the matching level coefficient of the kth face subjected to individual discrimination processing.

According to equation (2), as the number of faces detected increases and the matching level decreases, the transfer speed of the grouping target image can be decreased. This allows the user to thoroughly check the facial expression of each person and whether any unknown person is contained in the grouping target image, even if many persons are contained in the grouping target image.

The processing in steps S915 to S917 is the same as that in steps S514 to S516 in FIG. 5, and hence a description thereof will be omitted.

This embodiment has exemplified the case wherein a transfer speed is determined on the basis of equation (2). However, this embodiment may be configured to determine a transfer speed by using another mathematical expression and referring to table information associating a combination of the number of faces detected and a matching level with a transfer speed.

In this embodiment, the four matching levels are prepared. However, the embodiment may be configured to have more levels. In this case, finer transfer speed control can be performed.

(Effect)

As described above, a person as an object of a grouping target image is discriminated and grouped for each person by the image grouping function based on facial feature information registered by the personal feature registration function. When this process is to be displayed by animation, an image transfer speed is determined on the basis of the number of faces detected in a grouping target image and a matching level for each face.

This allows the user to thoroughly check the facial expression of each person and whether any unknown person is contained in the grouping target image, during animation display, even if many persons are contained in the grouping target image. In addition, the grouping destination of a given image can be changed to a desired grouping destination during animation display by simple user operation. This can therefore eliminate the necessity to manually correct the grouping result and reduce the correction load on the user.

Fourth Embodiment

The fourth embodiment of the present invention will be described below with reference to the accompanying drawings.

The arrangement of an image display apparatus to which the fourth embodiment is applied is the same as that of the first embodiment shown in FIG. 1.

The fourth embodiment exemplifies an arrangement which determines a sequence in which a grouping target image is transferred to a plurality of grouping destinations on the basis of a matching level indicating whether the facial feature information of a person as an object of the grouping target image matches the facial feature information of a person registered by a personal feature registration function.

Matching levels in this embodiment are the same as those in the third embodiment.

An image grouping function in the fourth embodiment will be described below.

(Information Processing Apparatus: Image Grouping Function)

Figure 10:
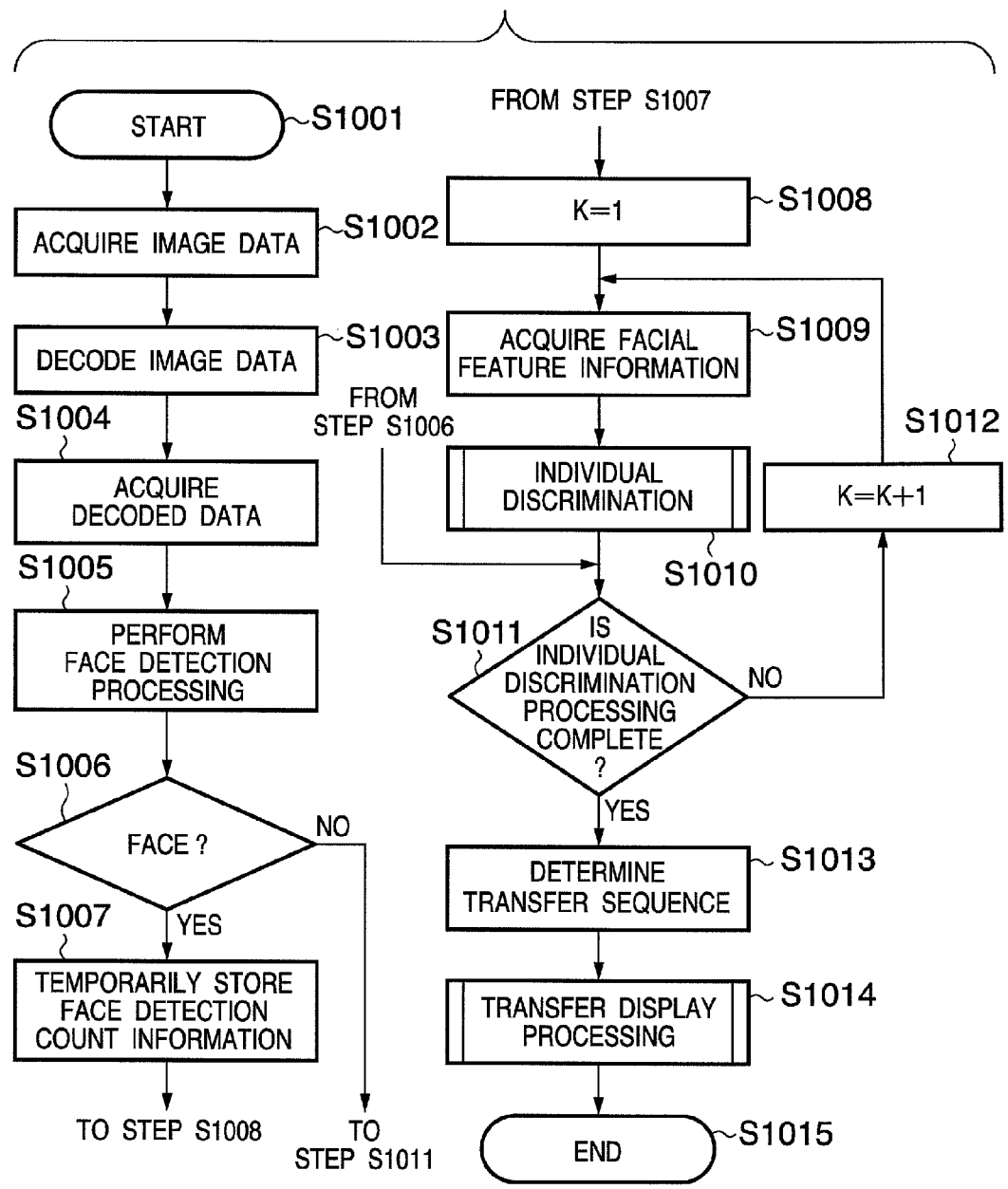
FIG. 10 is a flowchart showing an example of image grouping operation.

FIG. 10 is a flowchart showing the procedure of image grouping operation performed by a control unit 112 in cooperation with an image decoding unit 108, a face recognition processing unit 114, and the like.

The procedure of image grouping operation in FIG. 10 will be described below.

The processing in steps S1001 to S1012 is the same as that in steps S501 to S512 in FIG. 5, and a description thereof will be omitted.

(S1013: Determination of Transfer Sequence)

The control unit 112 determines a transfer sequence to a grouping destination on the basis of face detection count information of a grouping target image as a result of face detection processing and a matching level for each face as a result of individual discrimination processing.

First of all, the control unit 112 determines a matching level for each detected face.

The matching level is determined by the difference obtained as a result of the facial feature information described with reference to step S604 in FIG. 6. Such differences which are equal to or less than a threshold are categorized into three levels. The smaller the difference, the higher the matching level. Assume that when the difference obtained as a result of feature information comparison is equal to or larger than the threshold, level 0 (individual discrimination has failed) is determined.

If a grouping target image includes two or more faces, the control unit 112 determines a sequence in which the image is to be transferred to a plurality of grouping destinations.

Figure 11:
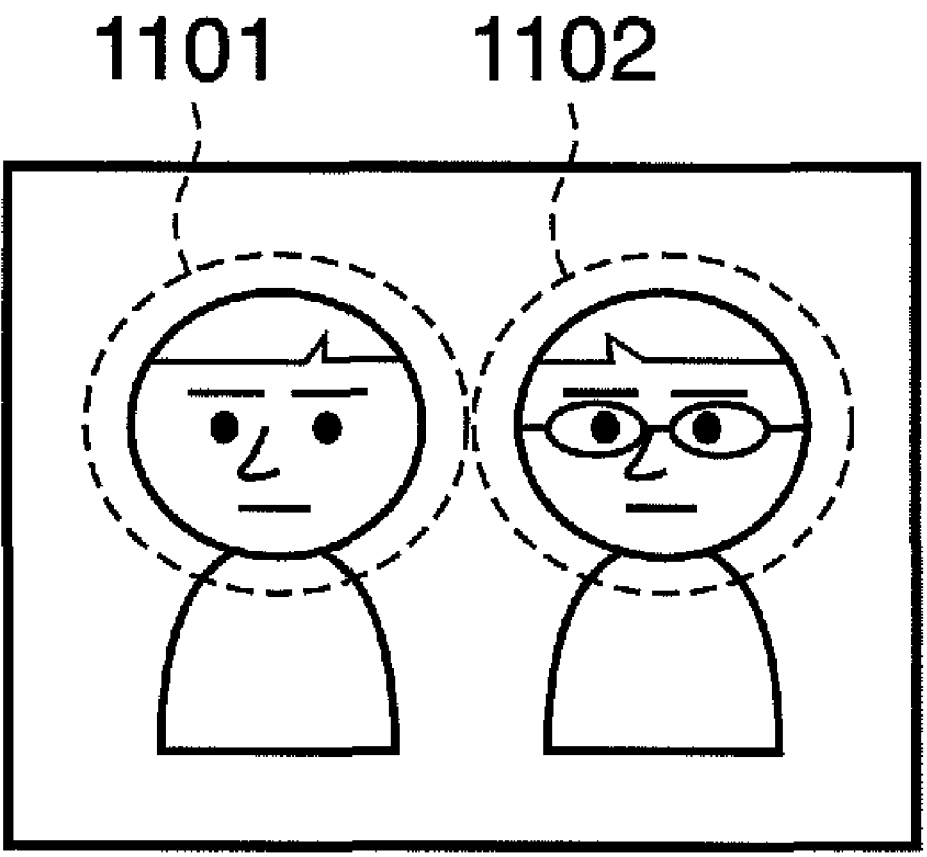
FIG. 11 is a view showing an example of a grouping target image.

FIG. 11 is a view showing an example of an image in which two persons "A" and "B" are contained as objects.

First of all, if the matching level of the face of "A" denoted by reference numeral 1101 is level 3, and the matching level of the face of "B" denoted by reference numeral 1102 is level 1, a transfer sequence is determined as follows. A sequence is determined such that the image is transferred first to the grouping designation of "A" with a high matching level, and is then transferred to the grouping destination of "B" with a low matching level.

In contrast, if the matching level of the face of "A" is level 1, and the matching level of the face of "B" denoted by reference numeral 1102 is level 3, a transfer sequence is determined as follows. A sequence is determined such that the image is transferred first to the grouping designation of "B" with a high matching level, and is then transferred to the grouping destination of "A" with a low matching level.

If the matching levels of the faces of "A" and "B" are equal, a sequence is determined such that the image is transferred to the grouping destination of a person subjected to individual discrimination processing first.

Even if three or more faces are detected, a sequence is determined in the above manner by comparing the matching levels of the respective faces.

(S1014: Transfer Display Processing)

After a sequence is determined, the manner of transferring the grouping target image to its grouping destination is displayed by animation.

Figure 12:
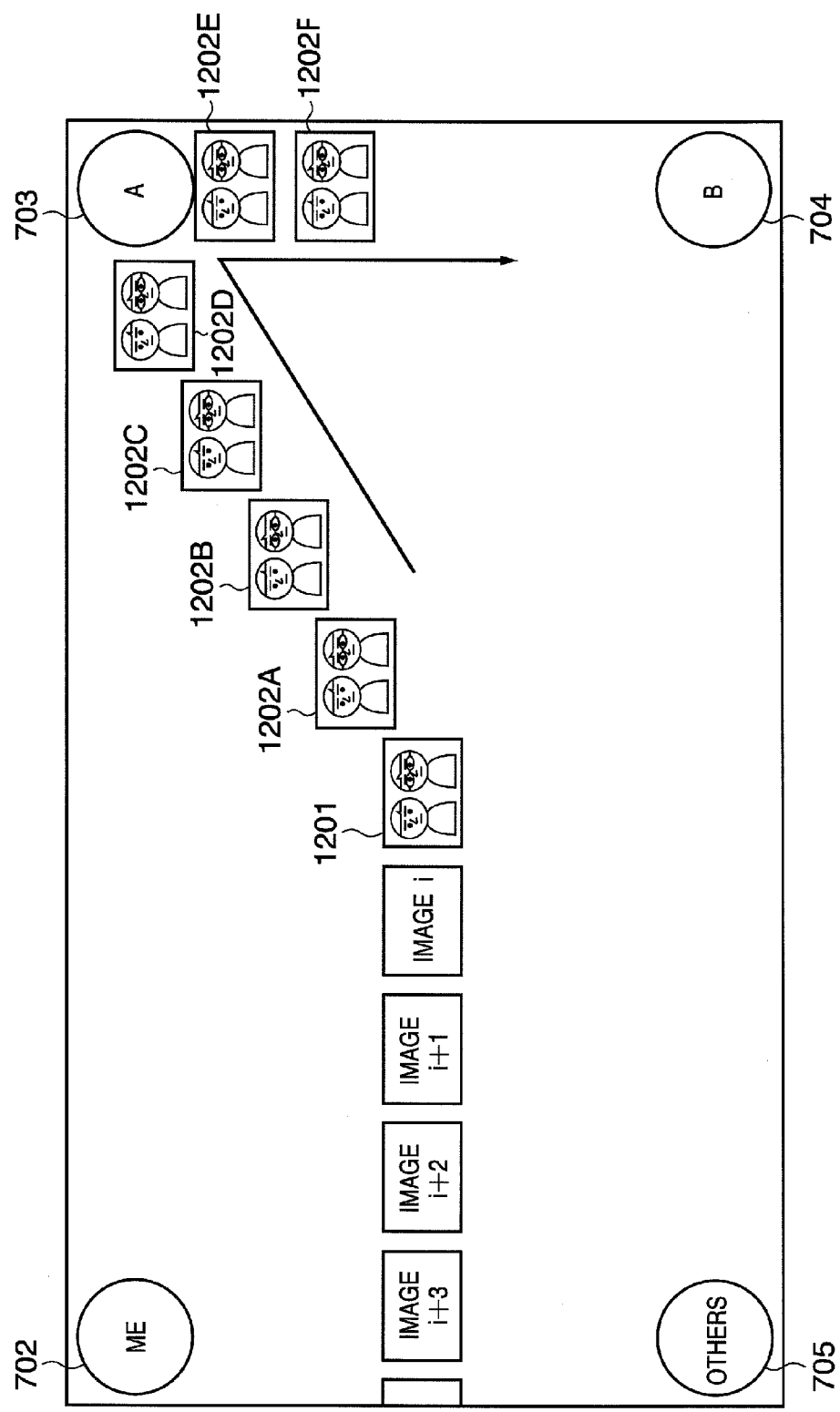
FIG. 12 is a view schematically showing an example of animation display at the time of image grouping.

FIG. 12 is a view showing an example of animation display in a case wherein a sequence is determined such that the image is transferred first to the grouping destination of "A" with a high matching level and is then transferred to the grouping destination of "B" with a low matching level.

Referring to FIG. 12, reference numeral 1201 denotes an image as a grouping target; 1202A, the display position of the grouping target image 1201 at time t12; and 1202B, the display position of the image at time t13. Likewise, reference numerals 1202C to 1202F denote the display positions of the image at time t14 to time t17.

The control unit 112 controls a display control unit 109 with the lapse of time to display the grouping target image at the position 1202A at time t12. At time t13, the control unit 112 performs control to erase the display at the position 1202A and display the image at the position 1202B. The control unit 112 repeats the above display control until the image reaches a grouping destination 703. At time t13, the control unit 112 performs control to display the image at the position 1202E. Subsequently, the control unit 112 repeats the same display control until the image reaches a grouping destination 704.

In the fourth embodiment, when an image reaches each grouping destination, the image data is stored in an accumulation area in an accumulation unit 113. If the user does not want to store the grouping target image, he/she may change the grouping destination by using the image grouping destination changing function described in the above embodiment. Alternatively, when the image reaches each grouping destination, the user may press a "return" key 207 of a remote controller 117 to inhibit the image from being accumulated.

(Effect)

As described above, a person as an object of a grouping target image is discriminated and grouped for each person by the image grouping function based on facial feature information registered by the personal feature registration function.

When this process is to be displayed by animation, a transfer sequence to a plurality of grouping destinations is determined on the basis of the number of faces detected in a grouping target image and a matching level for each face.

This allows the user to thoroughly check the facial expression of each person and whether any unknown person is contained in the grouping target image, during animation display, even if many persons are contained in the grouping target image. In addition, the grouping destination of a given image can be changed to a desired grouping destination during animation display by simple user operation. This can therefore eliminate the necessity to manually correct the grouping result and reduce the correction load on the user.

Fifth Embodiment

The fifth embodiment of the present invention will be described below with reference to the accompanying drawings.

Figure 13:
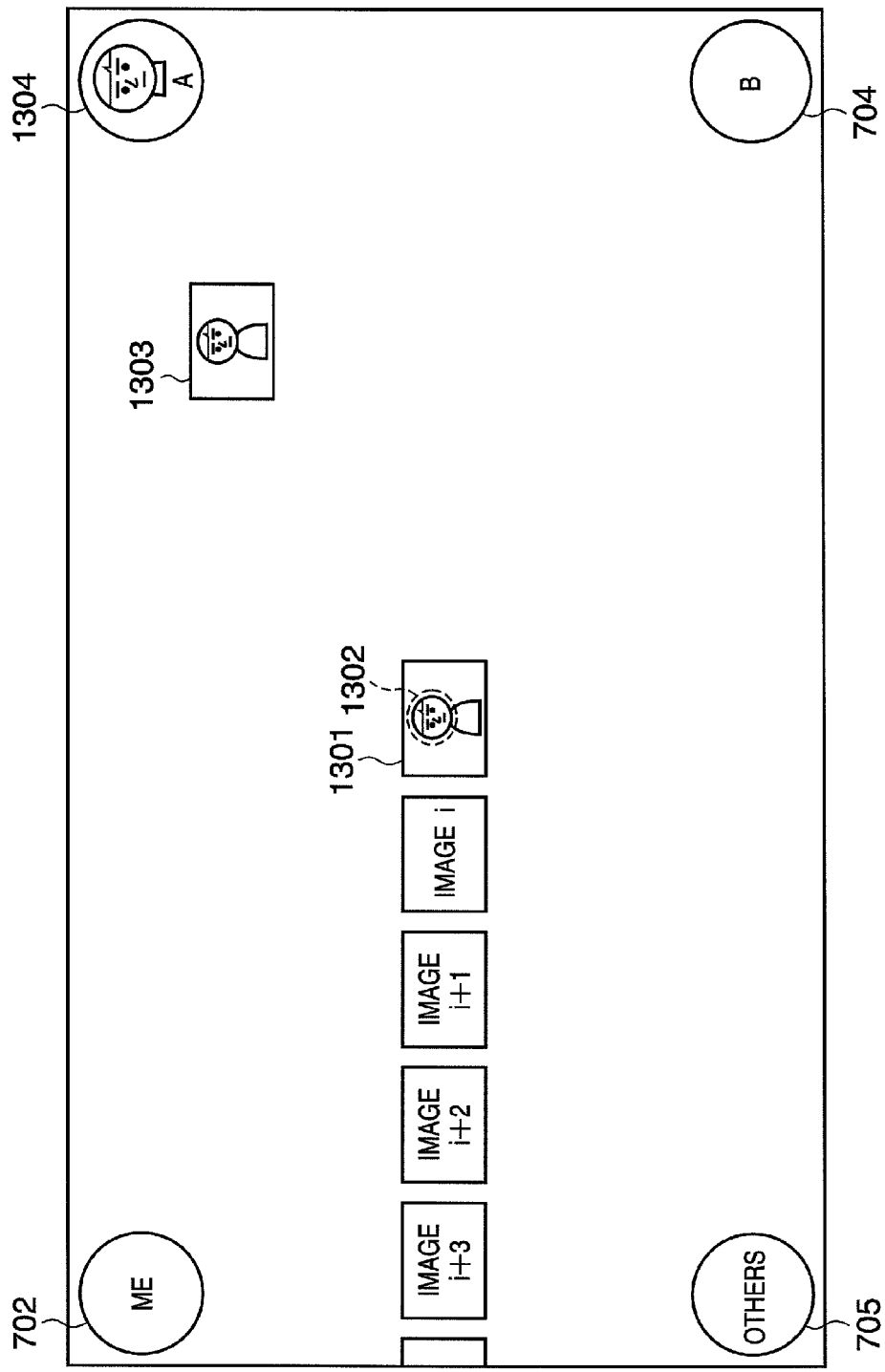
FIG. 13 is a view schematically showing an example of a display effect during animation display.

FIG. 13 is a view schematically showing an example of a display effect during animation display by the image grouping function.

Referring to FIG. 13, reference numeral 1301 denotes an image as a grouping target; and 1303, the display position of the grouping target image 1301 at time t18 during transfer display. Reference numeral 1302 indicates a state wherein a face area portion, in the grouping target image 1301, which is discriminated as a specific individual by the face detection processing and individual discrimination processing described in the above embodiment is highlighted and displayed by being encircled. Reference numeral 1304 indicates a state wherein the grouping destination of an image including "A" as an object is highlighted and displayed by superimposing a face image of "A" on the display at the grouping destination.

Highlighting such as the display 1302 and highlighting such as the display 1304 are added as display effects to animation display. These display effects make it possible to comprehensibly show to the user the reason for image grouping, i.e., a specific person detected in an image, on which grouping is based.

In this embodiment, the highlighting indicated by reference numeral 1302 is a circle. However, any shape that can surround a face area portion, e.g., a rectangle, may be used.

In addition, the highlighting indicated by reference numeral 1302 may be superimposed on the image 1303 during transfer display.

Sixth Embodiment

The sixth embodiment of the present invention will be described below with reference to the accompanying drawings.

Figure 14:
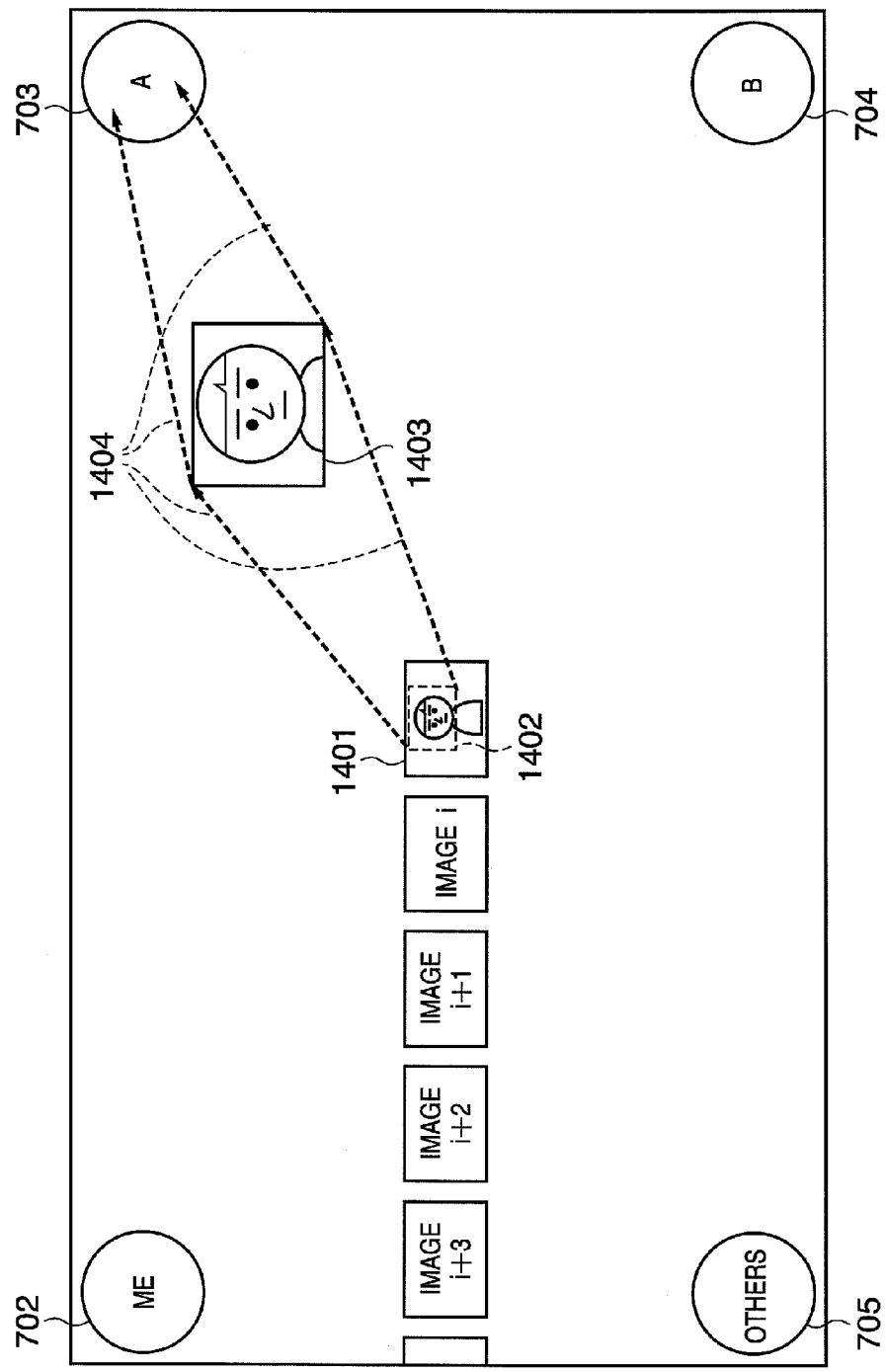
FIG. 14 is a view schematically showing an example of a display effect during animation display.

FIG. 14 is a view schematically showing an example of a display effect during animation display which is implemented by the image grouping function.

Referring to FIG. 14, reference numeral 1401 denotes an image as a grouping target. Reference numeral 1402 indicates a state wherein a face area portion, in the grouping target image 1401, which is discriminated as a specific individual by the face detection processing and individual discrimination processing described in the above embodiment is highlighted and displayed by being surrounded by a rectangle. Reference numeral 1403 indicates a state wherein a face area portion of the grouping target image 1401 at a given time, i.e., an area corresponding to the numeral 1402, is enlarged and displayed. Reference numeral 1404 schematically indicates a state wherein a face area portion of the grouping target image 1401 is enlarged and displayed at the display position 1403, and is displayed at a grouping destination 703 while being reduced. However, this state is not actually displayed on the window.

A control unit 112 clips the data of the face area portion 1402 of the grouping target image 1401 in the process of performing transfer display of the grouping target image 1401. The control unit 112 then sends the designations of a display position and display size to a display control unit 109, together with the clipped data, thereby displaying an image. In this case, the control unit 112 designates display positions and display sizes so as to display the image at the display position 1403 while enlarging it with the lapse of time and display the image at the position 703 while reducing the size to the original size.

Such highlighting and enlarged/reduced display like that indicated by reference numeral 1404 are added as display effects to animation display. These display effects make it possible to comprehensibly show to the user the reason for image grouping, i.e., a specific person detected in an image, on which grouping is based.

When an image is to be displayed while being enlarged with the lapse of time, the enlargement ratio may be determined on the basis of the matching level in the above embodiment.

Other Embodiment

The above embodiment of the present invention has exemplified the case wherein when images are to be grouped by the image grouping function, the user selects three persons from the person selection list. However, the number of persons is not limited to this. Grouping can be performed even if the user selects two or four or more persons.

Figure 15:
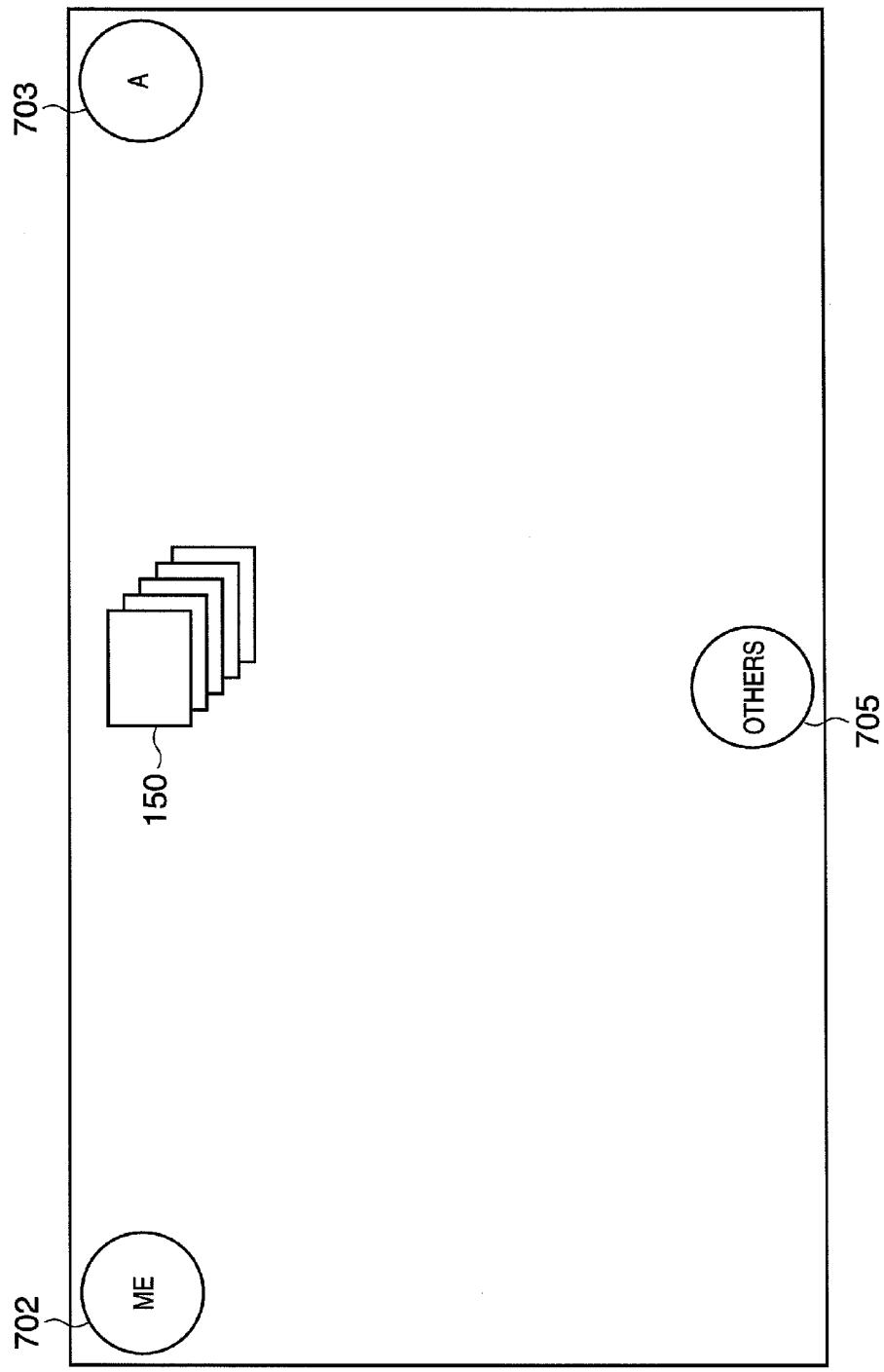
FIG. 15 is a view showing an example of a window to be displayed at the start of image grouping operation.

FIG. 15 shows an example of a window to be displayed at the start of image grouping operation when the user selects two persons.

Figure 16:
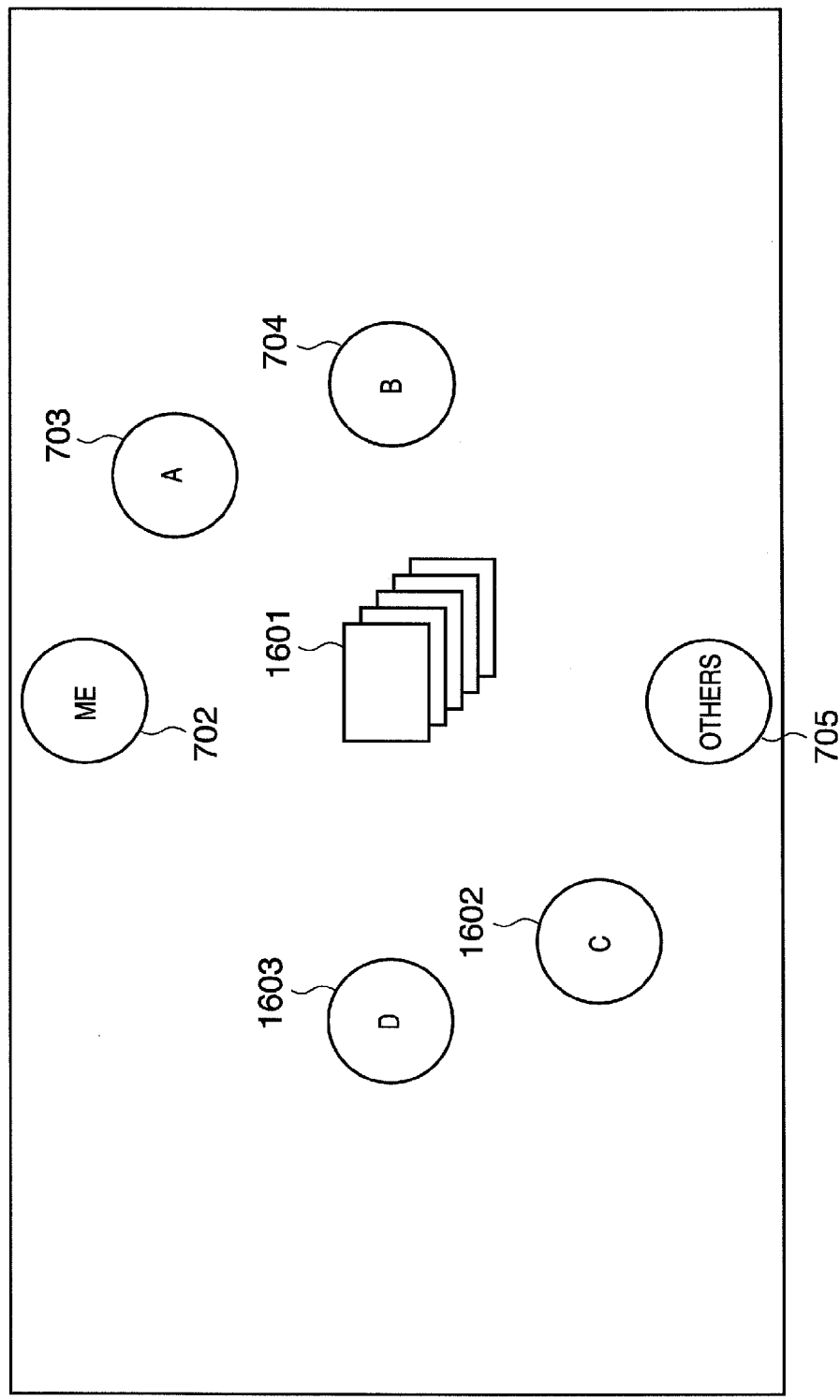
FIG. 16 is a view showing an example of a window to be displayed at the start of image grouping operation.

FIG. 16 shows an example of a window to be displayed at the start of image grouping operation when the user selects five persons.

An information processing apparatus 100 may determine the placement of a plurality of grouping destinations in accordance with the number of grouping destinations. In this case, a placement is preferably determined such that the distances between the placement positions of a grouping target images and the respective grouping destinations become equal to each other.

In addition, the information processing apparatus 100 may be configured to automatically perform individual discrimination processing for the objects in an image when an image input device 118 is connected or the image grouping function is started by the user, thereby presenting to the user the persons who can be grouped and starting grouping operation.

According to the description of the above embodiments, the grouping destination of an image is changed by using the "color" keys 209 of the remote controller 117. However, such a grouping destination may be changed by using the "numeral" key pad 208.

In addition, a threshold for the difference between facial feature information comparison results in the above embodiments may be changed by user operation.

The object of the present invention can also be achieved by implementing any parts of the functional blocks and operation shown in the accompanying drawings using hardware circuits or by software processing using a computer.

Although the above embodiments each have exemplified the case wherein images are grouped by using the face recognition technique, the present invention is not limited to this. For example, objects other than the faces of persons may be recognized, and the images may be grouped for the respective objects.

The present invention incorporates a case wherein programs of software for implementing the functions of the embodiments described above are directly or remotely supplied to a system or apparatus to cause the computer of the system or apparatus to read out and execute the programs, thereby implementing the functions.

The program codes themselves which are supplied and installed in the computer to allow the computer to implement the functions/processing of the present invention also realize the present invention. That is, the computer programs themselves, which implement the functions/processing of the present invention, are also incorporated in the present invention.

The object of each embodiment is also achieved by the following method. A storage medium (or a recording medium) storing software program codes for implementing the functions of the above embodiments is supplied to a system or apparatus. The computer (or a CPU or an MPU) of the system or apparatus reads out and executes the program codes stored in the storage medium. In this case, the program codes read out from the storage medium implement the functions of the above embodiments by themselves, and the storage medium storing the program codes constitutes the present invention. The functions of the above embodiments are implemented not only when the readout program codes are executed by the computer but also when the operating system (OS) or the like running on the computer performs part or all of actual processing on the basis of the instructions of the program codes.

The present invention also incorporates the following. The program codes read out from the storage medium are written in the memory of a function expansion card inserted into the computer or a function expansion unit connected to the computer. The CPU of the function expansion card or function expansion unit performs part or all of actual processing on the basis of the instructions of the program codes, thereby implementing the functions of the above embodiments.

When the present invention is to be applied to the above storage medium, program codes corresponding to the above sequences are stored in the storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-262988, filed Sep. 9, 2005, which is hereby incorporated by reference herein in its entirety.

What is claimed is:

1. An information processing apparatus which discriminates a selected face contained in an image, and which groups the image to a grouping destination, corresponding to the selected face, among a plurality of grouping destinations, comprising:

a display control unit adapted to display the image and objects of a plurality of grouping destinations on a screen, each of the objects of the plurality of grouping destinations corresponding to a different face registered in advance;

a discrimination unit adapted to discriminate the selected face from the image;

a grouping destination determination unit adapted to determine, on the basis of the discrimination result obtained by said discrimination unit, to which one of the objects of the plurality of grouping destinations the image is to be grouped;

wherein said display control unit controls movement of the image to a position of the object of the grouping destination determined by said grouping destination determination unit and controls to display by animation, on the screen, a process of moving the image to the position of the object of the grouping destination, and wherein said display control unit controls, on the basis of the discrimination result obtained by said discrimination unit, (a) to slow a moving speed of the image as a number of faces discriminated by said discrimination unit become large, or (b) to slow a moving speed of the image as a degree of matching is reduced between a face discriminated by said discrimination unit and a face corresponding to the object of the grouping destination.

2. The apparatus according to claim 1, wherein said display control unit controls to highlight and display an area including a face discriminated by said discrimination unit and an object of the grouping destination determined by said grouping destination determination unit.

3. The apparatus according to claim 1, wherein said display control unit displays an area including the face discriminated by said discrimination unit while enlarging the area in a process of moving the image to the position of the object of the grouping destination determined by said grouping destination determination unit.

4. The apparatus according to claim 3, wherein the discrimination result obtained by said discrimination unit includes reliability information as information associated with reliability that a said face contained in the first image is a specific face, and said display control unit changes, on the basis of the reliability information, an enlargement ratio at which the area is displayed and enlarged.

5. An information processing method of discriminating a selected face contained in an image, and of grouping the image to a grouping destination, corresponding to the face, among a plurality of grouping destinations, comprising:

a discrimination step of discriminating the selected face from the image;

a display control step of displaying the image and objects of a plurality of grouping destinations on a screen, each of the objects of the plurality of grouping destinations corresponding to a different face registered in advance;

a grouping destination determination step of determining, on the basis of the discrimination result obtained in the discrimination step, to which one of the objects of the plurality of grouping destinations the image is to be grouped; and wherein said display control step controls movement of the image to a position of the object of the grouping destination determined in the grouping destination determination step, and wherein said display control step controls, on the basis of the discrimination result obtained by said discrimination step, (a) to slow a moving speed of the image as a number of faces discriminated by said discrimination step becomes large, or (b) to slow a moving speed of the image as a degree of matching is reduced between a face discriminated by said discrimination step and a face corresponding to the object of the grouping destination.

6. The method according to claim 5, wherein in the display step, an area including a face discriminated in the discrimination step and an object of the grouping destination determined in the grouping destination determination step are highlighted and displayed.

7. The method according to claim 5, wherein in the display step, an area including the face discriminated in the discrimination step is displayed while being enlarged in a process of moving the image to the position of the object of the grouping destination determined in the grouping destination determination step.

8. The method according to claim 7, wherein the discrimination result obtained in the discrimination step includes reliability information as information associated with reliability that a face contained in the image is a specific face, and in the display control step, an enlargement ratio at which the area is displayed and enlarged is changed on the basis of the reliability information.

9. A non-transitory computer-readable storage medium storing a program causing a computer to execute the information processing method defined in claim 5.

* * * * *